(12) United States Patent
Park et al.

(10) Patent No.: US 12,481,331 B2
(45) Date of Patent: Nov. 25, 2025

(54) ELECTRONIC DEVICE INCLUDING SOUND UNIT

(71) Applicant: Samsung Electronics Co., Ltd., Suwon-si (KR)

(72) Inventors: Choonghyo Park, Suwon-si (KR); Kiwon Kim, Suwon-si (KR); Myoungsung Sim, Suwon-si (KR); Byounghee Lee, Suwon-si (KR); Woojin Cho, Suwon-si (KR); Joonrae Cho, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 17/894,566

(22) Filed: Aug. 24, 2022

(65) Prior Publication Data

US 2023/0029681 A1 Feb. 2, 2023

Related U.S. Application Data

(63) Continuation of application No. PCT/KR2022/008179, filed on Jun. 10, 2022.

(30) Foreign Application Priority Data

Jul. 27, 2021 (KR) .................. 10-2021-0098307

(51) Int. Cl.
*H04R 1/02* (2006.01)
*G06F 1/16* (2006.01)
*H04R 1/28* (2006.01)

(52) U.S. Cl.
CPC .......... *G06F 1/1677* (2013.01); *G06F 1/1652* (2013.01); *G06F 1/1681* (2013.01);
(Continued)

(58) Field of Classification Search
CPC ...... H04R 1/021; H04R 1/28; H04R 2499/11; H04R 2499/15; H04M 1/0214;
(Continued)

(56) References Cited

U.S. PATENT DOCUMENTS

| 7,245,949 B2 | 7/2007 | Kim et al. |
| 10,887,683 B1 | 1/2021 | Choi et al. |

(Continued)

FOREIGN PATENT DOCUMENTS

| CN | 103686527 B | 12/2016 |
| CN | 113114812 A | 7/2021 |

(Continued)

OTHER PUBLICATIONS

European Search Report dated Sep. 24, 2024, issued in European Application No. 22849710.3.
(Continued)

*Primary Examiner* — Huyen D Le
(74) *Attorney, Agent, or Firm* — Jefferson IP Law, LLP

(57) ABSTRACT

An electronic device is provided. The electronic device includes a first housing, a second housing, a display, and a sound unit configured to output or receive a sound, the sound unit being disposed in the second housing such that the sound is radiated in a first direction through a second side surface in an open state and radiated in a second direction different from the first direction along a first side surface in a closed state.

11 Claims, 15 Drawing Sheets

(52) U.S. Cl.
CPC ........... *G06F 1/1688* (2013.01); *H04R 1/021* (2013.01); *H04R 1/28* (2013.01); *H04R 2400/11* (2013.01); *H04R 2499/11* (2013.01); *H04R 2499/15* (2013.01)

(58) Field of Classification Search
CPC ... H04M 1/0235; H04M 1/035; G06F 1/1624; G06F 1/1688
See application file for complete search history.

(56) References Cited

U.S. PATENT DOCUMENTS

| | | |
|---|---|---|
| 2009/0325653 A1 | 12/2009 | Kim et al. |
| 2018/0109871 A1 | 4/2018 | Huh et al. |
| 2019/0302842 A1 | 10/2019 | Sun et al. |
| 2020/0412859 A1 | 12/2020 | Xiao et al. |
| 2021/0006876 A1* | 1/2021 | Moon ................... H04R 1/345 |
| 2025/0024615 A1* | 1/2025 | Cho ..................... H05K 5/0086 |

FOREIGN PATENT DOCUMENTS

| | | |
|---|---|---|
| JP | 2019-110528 A | 7/2019 |
| KR | 10-2013-0045107 A | 5/2013 |
| KR | 10-2020-0086029 A | 7/2020 |
| KR | 10-2020-0119003 A | 10/2020 |
| KR | 10-2020-0124989 A | 11/2020 |
| KR | 10-2021-0003538 A | 1/2021 |
| KR | 10-2202228 B1 | 1/2021 |

OTHER PUBLICATIONS

International Search Report dated Aug. 31, 2022, issued in International Application No. PCT/KR2022/008179.

* cited by examiner

ELECTRONIC DEVICE INCLUDING SOUND UNIT

CROSS-REFERENCE TO RELATED APPLICATION(S)

This application is a continuation application, claiming priority under § 365(c), of an International application No. PCT/KR2022/008179, filed on Jun. 10, 2022, which is based on and claims the benefit of a Korean patent application number 10-2021-0098307, filed on Jul. 27, 2021, in the Korean Intellectual Property Office, the disclosure of which is incorporated by reference herein in its entirety.

BACKGROUND

1. Field

The disclosure relates to an electronic device including a sound unit. More particularly, the disclosure relates to an electronic device including a flexible display, the electronic device that switches a direction of radiation from a sound unit or a direction of radiation to the sound unit.

2. Description of Related Art

Electronic devices including flexible displays are being developed. According to an example of an electronic device, a display may be positioned on a plurality of housings and folded and unfolded while the plurality of housings form an angle. According to another example of an electronic device, one housing may move relative to another housing such that a screen display area of the display may be expanded.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that uses a flexible display and secures stable sound performance.

Additional aspects will be set forth in part in the description which follows and, in part, will be apparent from the description, or may be learned by practice of the presented embodiments.

In accordance with an aspect of the disclosure, an electronic device is provided. The electronic device includes a first housing including a first surface and a first side surface connected to the first surface, a second housing including a second surface and a second side surface connected to the second surface, the second housing configured to move relative to the first housing between a closed state in which the second surface faces the first surface and the second side surface faces the first side surface and an open state in which the second surface moves along the first surface and the second side surface moves along the first side surface, a display positioned on an opposite side of the first surface and an opposite side of the second surface, the display having a first area in the closed state and having a second area greater than the first area in the open state, and a sound unit configured to output or receive a sound, the sound unit positioned in the second housing such that the sound is radiated in a first direction through the second side surface in the open state and radiated in a second direction different from the first direction along the first side surface in the closed state.

In accordance with another aspect of the disclosure, an electronic device is provided. The electronic device includes a first housing including a first surface, a first side surface connected to the first surface, and a first duct connected to the first side surface, a second housing including a second surface, a second side surface connected to the second surface, and a second duct connected to the second side surface, the second housing configured to move relative to the first housing between a closed state in which the second surface faces the first surface, the second side surface faces the first side surface, and the first duct and the second duct are aligned and an open state in which the second surface moves along the first surface, the second side surface moves along the first side surface, and the first duct and the second duct are not aligned, a display positioned on an opposite side of the first surface and an opposite side of the second surface, the display having a first area in the closed state and having a second area greater than the first area in the open state, a sound unit positioned in the second housing, connected to the second duct, and configured to output or receive a sound, and a sealing portion positioned between the first side surface and the second side surface and around the first duct and the second duct.

In accordance with another aspect of the disclosure, an electronic device is provided. The electronic device includes a display including a first area, a second area, and a flexible area between the first area and the second area, a first housing positioned in the first area and including a waveguide, a second housing positioned in the second area, a hinge structure connecting the first housing and the second housing, positioned in at least a portion of the flexible area, and configured to rotate the second housing relative to the first housing between a folded state in which the first area and the second area face each other and an unfolded state in which the first area and the second area do not face each other, and a sound unit configured to output or receive a sound, the sound unit positioned in the second housing such that the sound is radiated in a first direction through the second housing in the unfolded state and radiated in a second direction different from the first direction along the waveguide in the folded state.

According to various embodiments, it is possible to secure stable sound performance by switching a radiation direction according to a change in a state of an electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
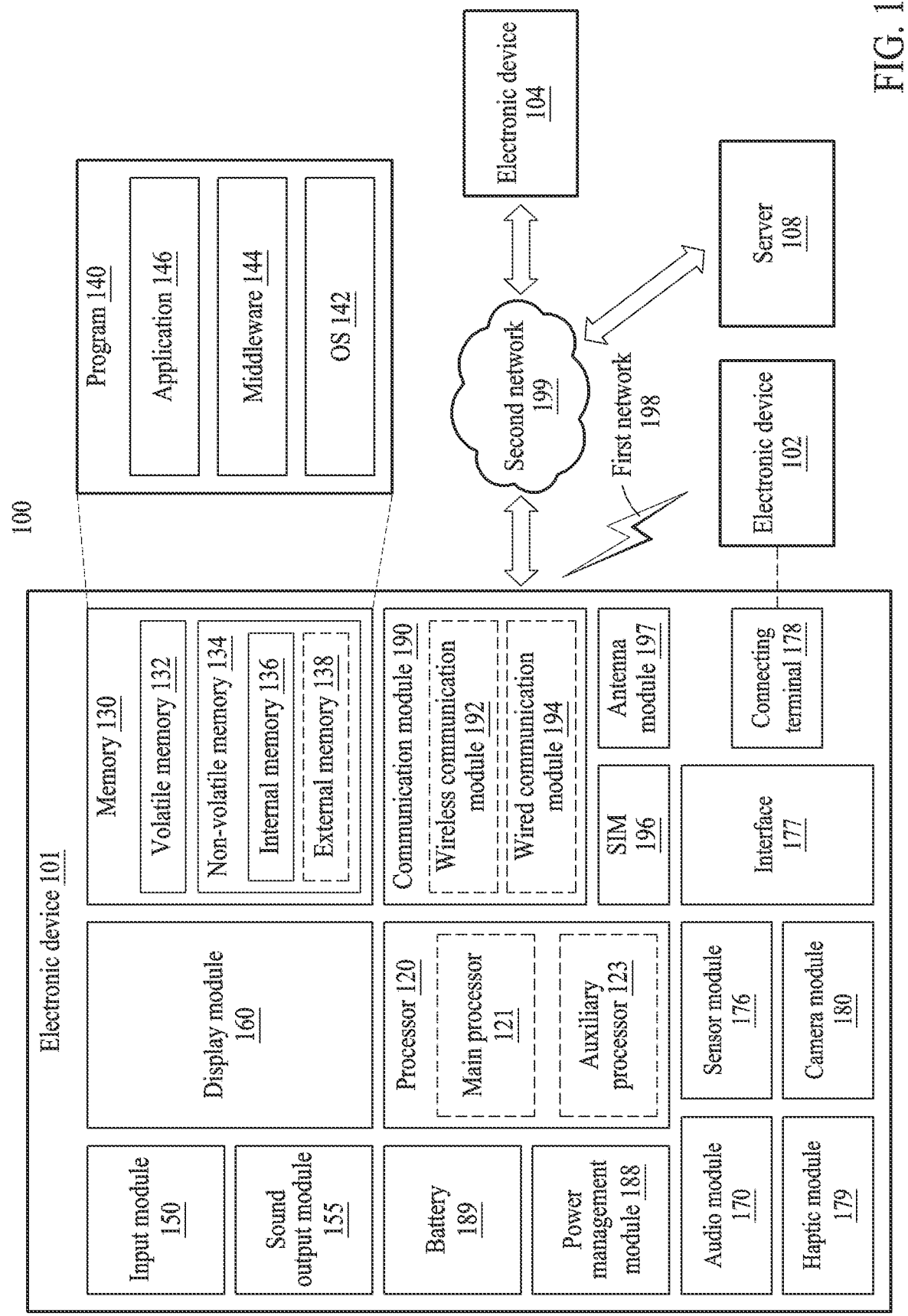
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors (ISPs), or flashes.

The power management module 188 may manage power supplied to the electronic device 101. According to an embodiment, the power management module 188 may be implemented as, for example, at least a portion of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, Wi-Fi direct, or infrared data association (IrDA)) or the second network 199 (e.g., a long-range communication network, such as a legacy cellular network, a $5^{th}$ generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to various embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smart phone), a computer device, a portable multimedia device, a portable medical device, a camera, a wearable device, or a home appliance device. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
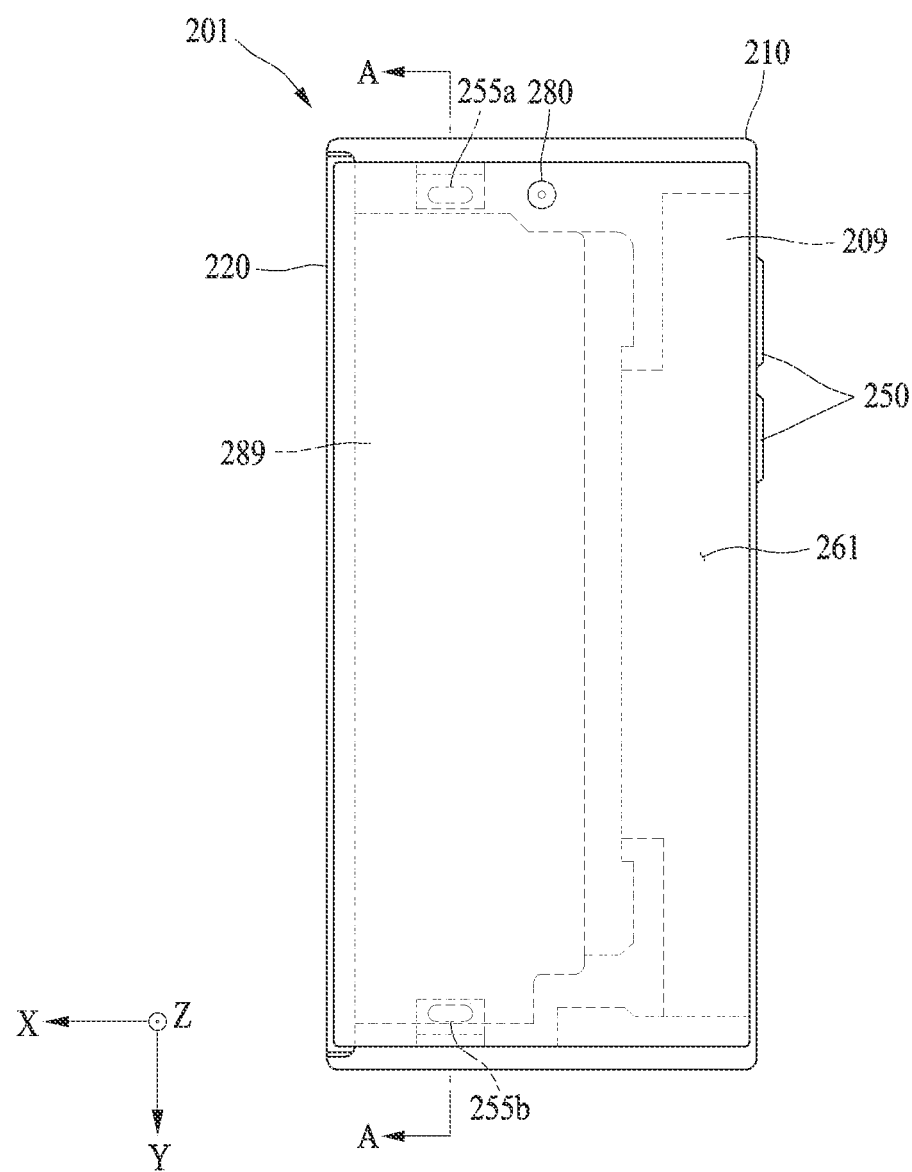
FIG. 2A is a view of an electronic device in a closed state according to an embodiment of the disclosure.
Figure 2B:
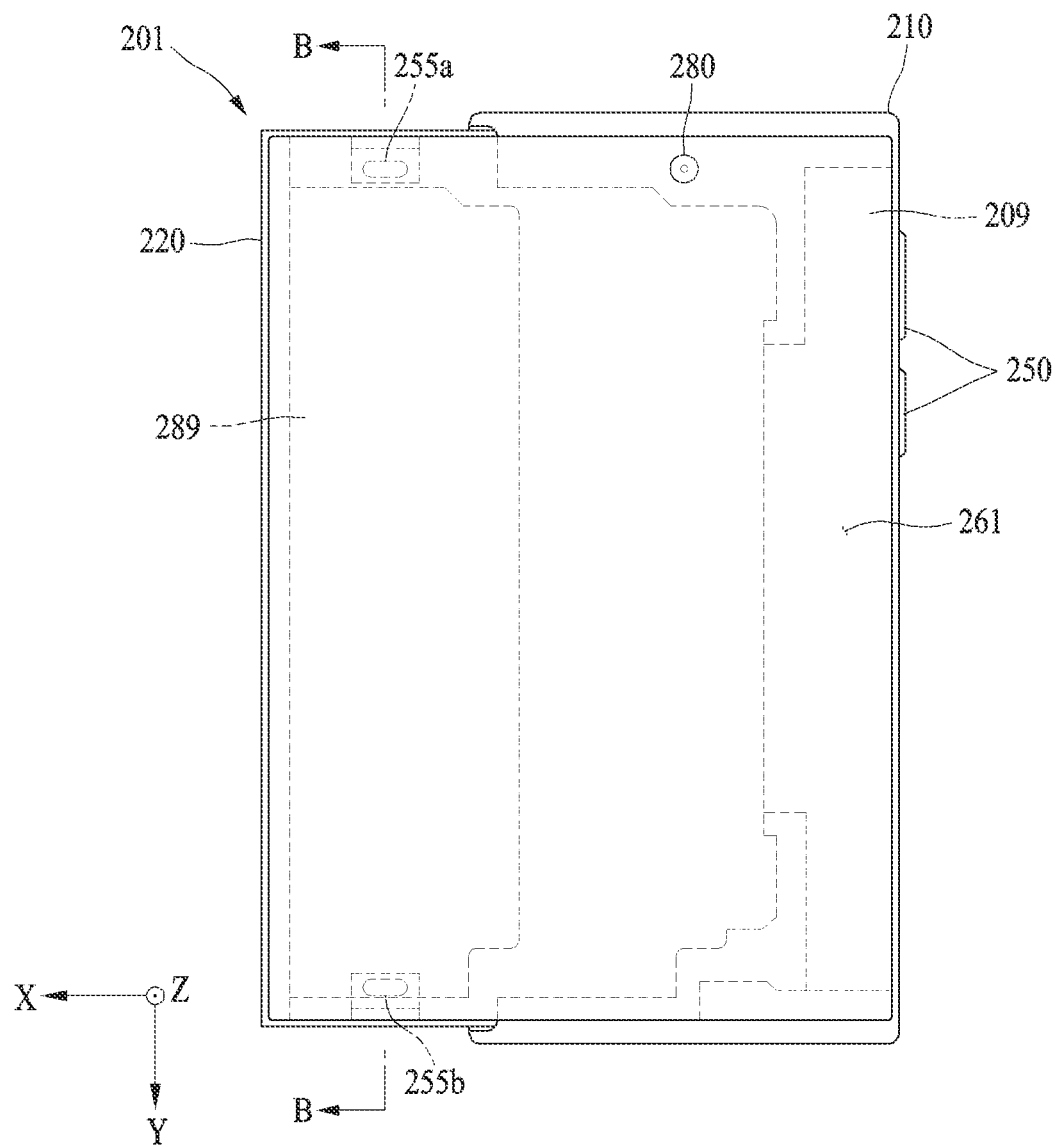
FIG. 2B is a view of an electronic device in an open state according to an embodiment of the disclosure.

FIG. 2A is a view of an electronic device in a closed state according to an embodiment of the disclosure, and FIG. 2B is a view of the electronic device in an open state according to an embodiment of the disclosure.

Referring to FIGS. 2A and 2B, a slidable or rollable electronic device 201 (e.g., the electronic device 101 of FIG. 1) according to an embodiment may include a first housing 210 and a second housing 220 movably coupled to each other, a driving body (e.g., a driving body 330 of FIG. 3A), and a display 261 (e.g., a flexible display or rollable display) disposed in a space formed by the first housing 210 and the second housing 220. In the disclosure, a surface on which the display 261 is disposed may be defined as a front surface of the electronic device 201, and a surface opposite to the front surface may be defined as a rear surface of the electronic device 201. In addition, a surface surrounding a space between the front surface and the rear surface may be defined as a side surface of the electronic device 201.

In an embodiment, the second housing 220 may be coupled to the first housing 210 to slide relative to the first housing 210. Meanwhile, various embodiments of the disclosure describe that the second housing 220 moves relative to the first housing 210, but are not limited thereto, and it may also be construed that the first housing 210 slides relative to the second housing 220. In other words, the first housing 210 and the second housing 220 may move relative to each other.

In an embodiment, a state of the electronic device 201 may be defined according to the driving of the driving body (e.g., the driving body 330). For example, when the driving body is in a first state (e.g., when a rotation angle of a roller (e.g., a rolling shaft) 331 exceeds a first threshold such that the display 261 has a first area), a closed state of the electronic device 201 (e.g., the electronic device 201 of FIG. 2A) may be defined. Here, the closed state of the electronic device 201 may be defined as a state in which an area of the first housing 210 and an area of the second housing 220 substantially fully overlap, when viewed in FIG. 2A. Meanwhile, when the driving body is in a second state of moving the second housing 220 and/or expanding the display 261 (e.g., when the rotation angle of the roller 331 exceeds a second threshold greater than the first threshold such that the display 261 expands to have a second area greater than the first area), an open state of the electronic device 201 (e.g., the electronic device 201 of FIG. 2B) may be defined. Here, the open state of the electronic device 201 may be defined as a state in which an area of the first housing 210 and an area of the second housing 220 at least partially overlap, when viewed in FIG. 2B. When the electronic device 201 is in the open state, substantially all areas of the display 261 may be exposed to the outside. Meanwhile, when the display 261 has an area between the first area and the second area, an intermediate state of the electronic device 201 may be defined.

The electronic device 201 may include a circuit board 209, an input module 250 (e.g., the input module 150 of FIG. 1), a first sound unit 255a (e.g., the sound output module 155 or the audio module 170 of FIG. 1), a second sound unit 255b (e.g., the sound output module 155 or the audio module 170 of FIG. 1), a camera module 280 (e.g., the camera module 180 of FIG. 1), and a battery 289 (e.g., the battery 189 of FIG. 1). Meanwhile, the term "sound unit" mentioned herein may be used as a concept including a sound output module (e.g., the sound output module 155 of FIG. 1) or one or more components (e.g., speakers) constituting the sound output module, an audio module (e.g., the audio module 170 of FIG. 1) or one or more components (e.g., microphones) constituting the audio module, and other sound processing devices. For example, in various embodiments where the sound unit includes a sound output module, the sound unit may include a speaker configured to generate a sound and an enclosure (e.g., an enclosure 357 of FIG. 3D) that surrounds the speaker and defines a resonant space, but is not limited thereto, and may also be construed as a device including a speaker and not having a resonant space.

In an embodiment, the circuit board 209, the input module 250, and the camera module 280 may be positioned in the first housing 210, and the first sound unit 255a, the second sound unit 255b, and the battery 289 may be positioned in the second housing 220. In some embodiments, the first sound unit 255a may be positioned in or adjacent to a first end portion (e.g., an upper end portion) of the second housing 220, and the second sound unit 255b may be positioned in or adjacent to a second end portion (e.g., a lower end portion), opposite to the first end portion, of the second housing 220. For example, when the first sound unit 255a and the second sound unit 255b are sound output modules, the structure in which the first sound unit 255a and the second sound unit 255b are arranged in the second housing 220 may improve transmitter and receiver performance of the electronic device 201 in the closed state of the electronic device 201 and improve radiation performance of a sound output from the first sound unit 255a and/or the second sound unit 255b in the open state of the electronic device 201, thereby improving stereo sound output efficiency and channel separation by the first sound unit 255a and the second sound unit 255b.

In an embodiment, the circuit board 209, the input module 250, the first sound unit 255a, and the camera module 280 may be positioned in the first housing 210, and the second sound unit 255b and the battery 289 may be positioned in the second housing 220. In some embodiments, the first sound unit 255a may be positioned in or adjacent to one end portion (e.g., an upper end portion) of the first housing 210, and the second sound unit 255b may be positioned in or adjacent to one end portion (e.g., a lower end portion) of the second housing 220.

Figure 3A:
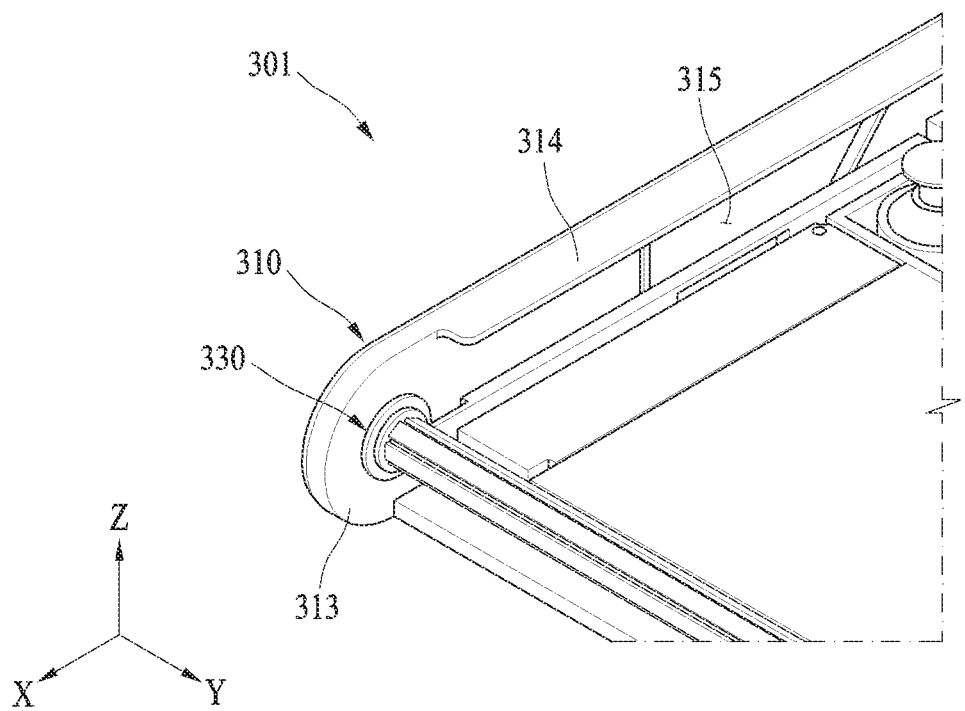
FIG. 3A is a perspective view of a portion of an electronic device according to an embodiment of the disclosure.
Figure 3B:
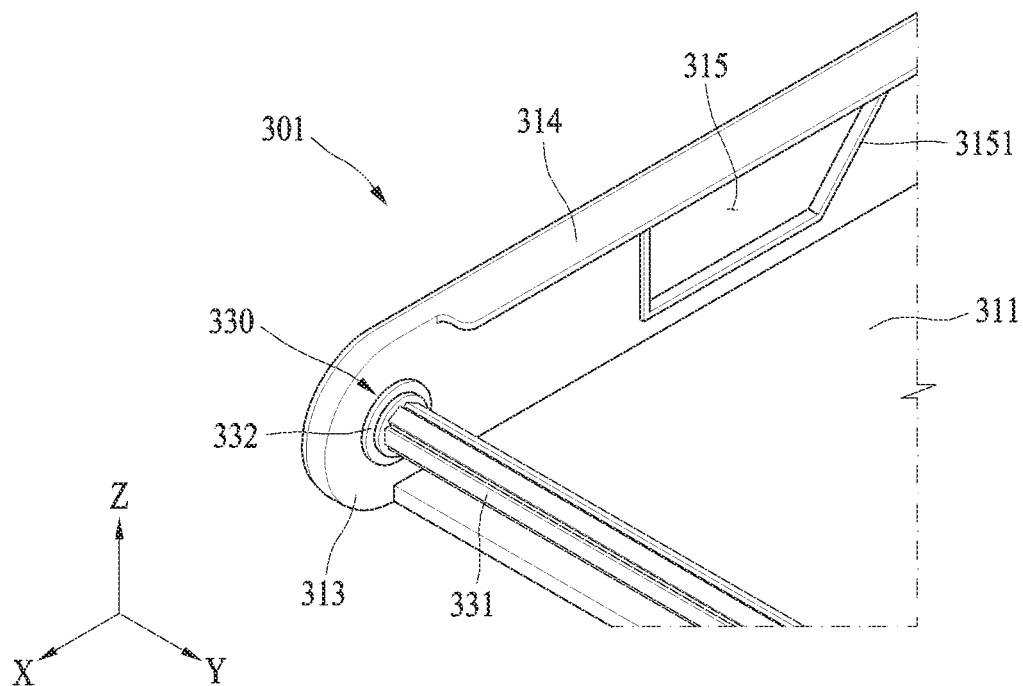
FIG. 3B is a perspective view of a portion of an electronic device according to an embodiment of the disclosure.
Figure 3C:
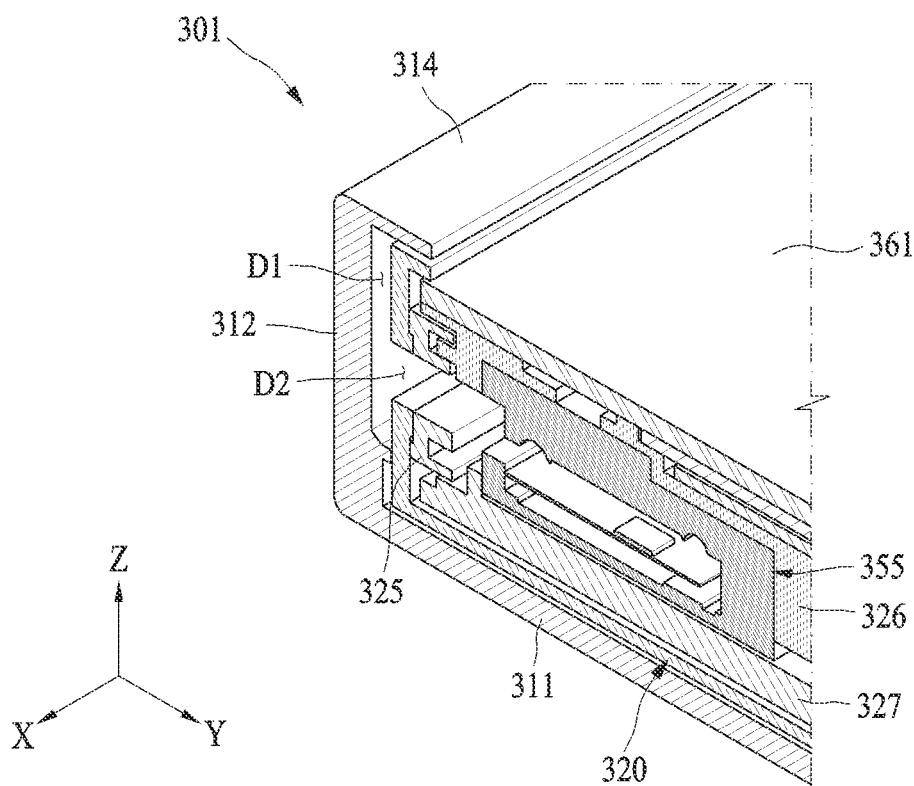
FIG. 3C is a cross-sectional perspective view of an electronic device in a closed state, viewed along a line A-A of FIG. 2A, according to an embodiment of the disclosure.
Figure 3D:
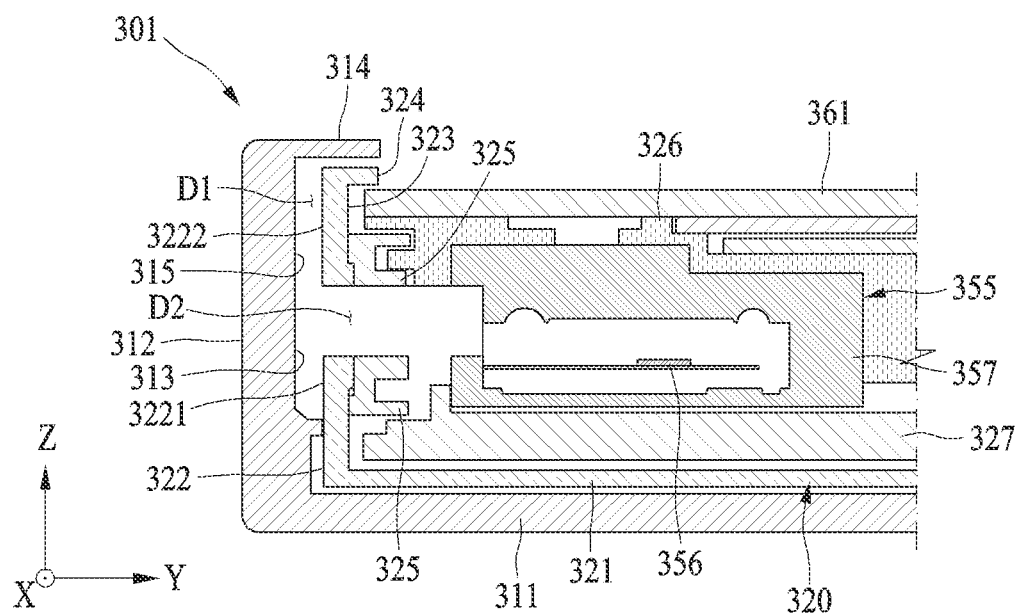
FIG. 3D is a cross-sectional view of an electronic device in a closed state, viewed along a line A-A of FIG. 2A, according to an embodiment of the disclosure.
Figure 3E:
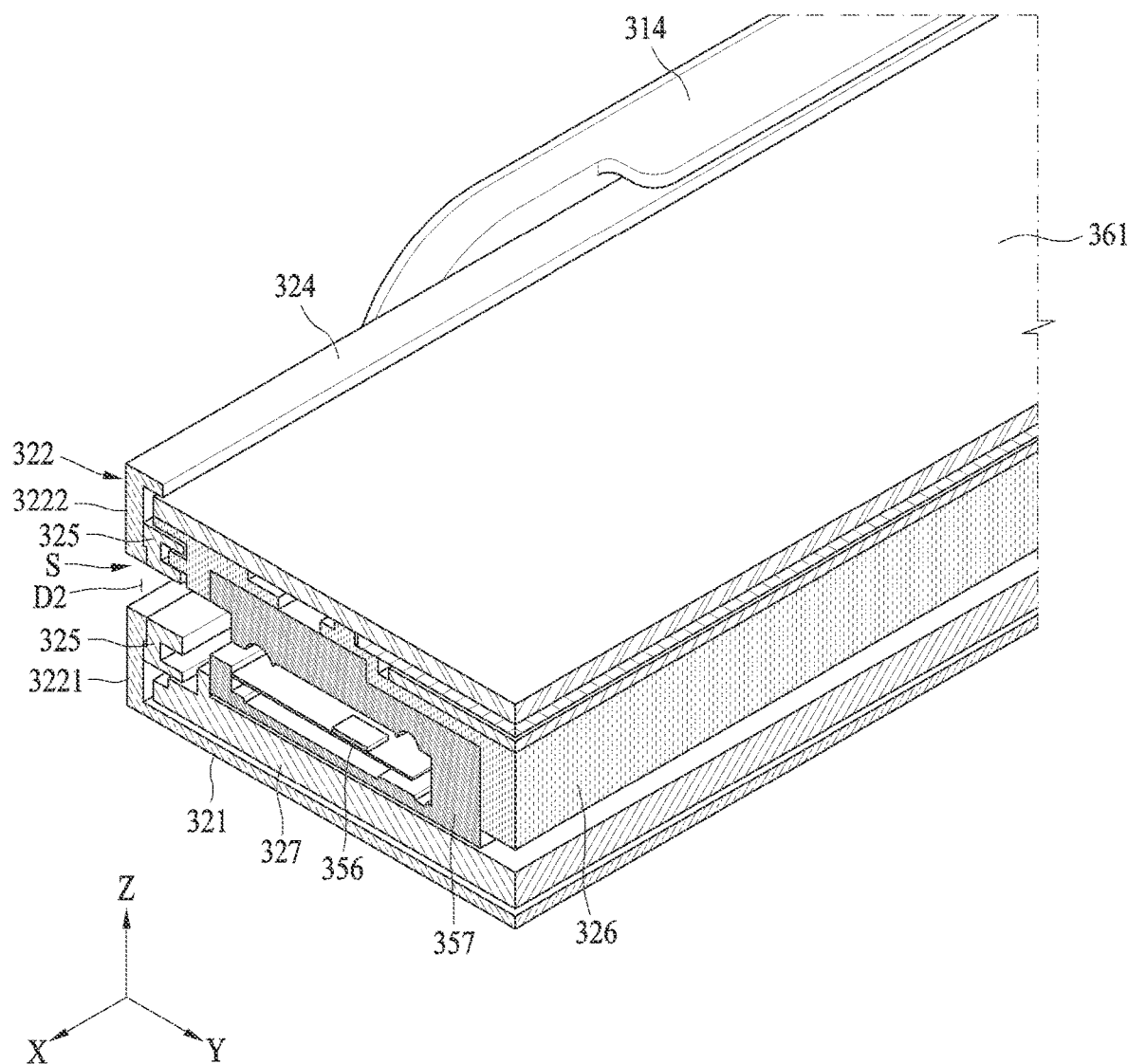
FIG. 3E is a cross-sectional perspective view of an electronic device in an open state, viewed along a line B-B of FIG. 2B, according to an embodiment of the disclosure.
Figure 3F:
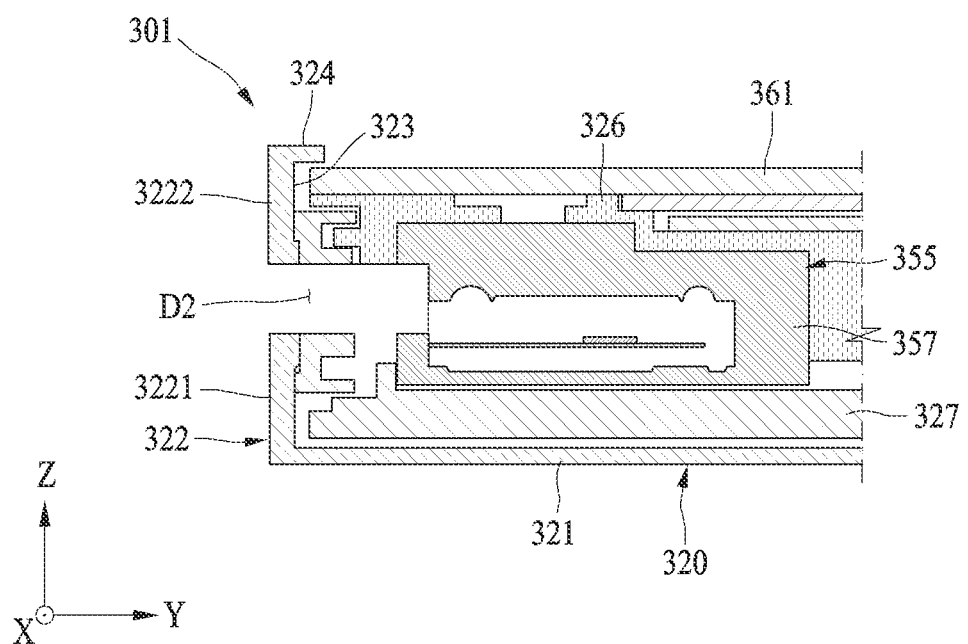
FIG. 3F is a cross-sectional view of an electronic device in an open state, viewed along a line B-B of FIG. 2B, according to an embodiment of the disclosure.

FIG. 3A is a perspective view of a portion of an electronic device according to an embodiment of the disclosure, and FIG. 3B is a perspective view of a portion of the electronic device according to an embodiment of the disclosure. FIG. 3C is a cross-sectional perspective view of the electronic device in a closed state, viewed along a line A-A of FIG. 2A, according to an embodiment of the disclosure, and FIG. 3D is a cross-sectional view of the electronic device in the closed state, viewed along the line A-A of FIG. 2A, according to embodiments of the disclosure. FIG. 3E is a cross-sectional perspective view of the electronic device in an open state, viewed along a line B-B of FIG. 2B, according to an embodiment of the disclosure, and FIG. 3F is a cross-sectional view of the electronic device in the open state, viewed along the line B-B of FIG. 2B, according to embodiments of the disclosure.

Referring to FIGS. 3A to 3F, an electronic device 301 (e.g., the electronic device 201 of FIGS. 2A and 2B) according to an embodiment may include a first housing 310 (e.g., the first housing 210 of FIGS. 2A and 2B), a second housing 320 (e.g., the second housing 220 of FIGS. 2A and 2B), the driving body 330, a sound unit 355 (e.g., the first sound unit 255a of FIGS. 2A and 2B), and a display 361 (e.g., the display 261 of FIGS. 2A and 2B).

The first housing 310 may include a first surface 311 (e.g., a first bottom surface or a first base surface), a plurality of first outer side surfaces 312 connected to the first surface 311, and a plurality of first inner side surfaces 313 connected to the first surface 311. The first surface 311 may form a portion (e.g., a first bottom portion or a first base portion) of the electronic device 301, and the plurality of first outer side surfaces 312 and the plurality of first inner side surfaces 313 respectively corresponding to the plurality of first outer side surfaces 312 may form a portion (e.g., a first side portion) of the electronic device 301.

In an embodiment, the first housing 310 may include a third surface 314 (e.g., a first top surface or a first bezel surface) extending from at least one of the plurality of first inner side surfaces 313 in one direction (e.g., a +Y direction). The third surface 314 may be positioned opposite the first surface 311. In an embodiment, the third surface 314 may at least partially overlap an edge area of the display 361. In an embodiment, the third surface 314 may extend in one direction (e.g., a +/−X direction) along at least a portion of the first inner side surfaces 313. In the closed state of the electronic device 301, the third surface 314 may guide a sound radiated between a first inner side surface 313 and a second outer side surface 322 to the outside of the electronic device 301.

In an embodiment, the first inner side surface 313 may include a recess 315. In an embodiment, the recess 315 is a rim 3151 forming a boundary between a portion, of the first inner side surface 313, in which the recess 315 is formed and a portion in which the recess 315 is not formed. In an embodiment, the rim 3151 may protrude from the first inner side surface 313. In an embodiment, the recess 315 and/or the rim 3151 may have a substantially circular shape, a polygonal shape, and various other shapes.

The second housing 320 may include a second surface 321 (e.g., a second bottom surface or a second base surface), a plurality of second outer side surfaces 322 connected to the second surface 321, and a plurality of second inner side surfaces 323 connected to the second surface 321.

In the closed state (e.g., FIG. 3C) of the electronic device 301, the second surface 321 may be positioned substantially on the first surface 311, and the plurality of second outer side surfaces 322 may be separated by a gap from the plurality of first inner side surfaces 313 while facing the plurality of first inner side surfaces 313 respectively corresponding to the plurality of second outer side surfaces 322. In the open state (see FIG. 3E) of the electronic device 301, the second surface 321 may move along the first surface 311 (e.g., move in the +X direction) and form a portion (e.g., a second bottom portion or a second base portion) of the electronic device 301. The plurality of second outer side surfaces 322 may move along the plurality of first inner side surfaces 313, and the plurality of second outer side surfaces 322 and the plurality of second inner side surfaces 323 may form a portion (e.g., a second side portion) of the electronic device 301.

In an embodiment, the first inner side surface 313 and the second outer side surface 322 may define at least a portion of a first duct D1 through which a sound is radiated. For example, the first inner side surface 313 and the second outer side surface 322 may be substantially parallel to each other. As another example, the first inner side surface 313 and the second outer side surface 322 may not be parallel and form at least a portion of the first duct D1 in another shape (e.g., a tapered shape). In some embodiments, the second outer side surface 322 and the recess 315 may form at least a portion of the first duct D1. The recess 315 may guide a sound radiated between the first inner side surface 313 and the second outer side surface 322.

In an embodiment, the second outer side surface 322 and the second inner side surface 323 may form a first wall 3221 connected to the second surface 321 and a second wall 3222 separated by a gap from the first wall 3221. The first wall 3221 and the second wall 3222 may form at least a portion of a second duct D2 through which a sound is radiated. In an embodiment, the gap between the first wall 3221 and the second wall 3222 may be implemented as a slit S at least partially extending along the second outer side surface 322 and the second inner side surface 323.

In an embodiment, the second housing 320 may include a fourth surface 324 (e.g., a second top surface or a second bezel surface) extending from at least one of the plurality of second inner side surfaces 323 in one direction (e.g., the +Y direction). The fourth surface 324 may be positioned opposite the second surface 321. In an embodiment, the fourth surface 324 may at least partially overlap an edge area of the display 361. In an embodiment, the fourth surface 324 may at least partially overlap the third surface 314. In an embodiment, the fourth surface 324 may extend in one direction (e.g., the +/−X direction) along at least a portion of the second inner side surface 323.

In an embodiment, the third surface 314 and the fourth surface 324 may form at least a portion of the first duct D1 through which the sound is radiated. In an embodiment, a width of a portion of the first duct D1 formed between the third surface 314 and the fourth surface 324 may be substantially equal to or less than a width of a portion of the first duct D1 formed between the first inner side surface 313 and the second outer side surface 322. In the closed state of the electronic device 301, the fourth surface 324 and the third surface 314 may guide a sound radiated between the first inner side surface 313 and the second outer side surface 322 to the outside of the electronic device 301. In an embodiment, the third surface 314 and the fourth surface 324 may be substantially parallel to each other. In another embodiment, the third surface 314 and the fourth surface 324 may not be parallel to each other and form at least a portion of the first duct D1 in another shape (e.g., a tapered shape).

In an embodiment, the second housing 320 may include a pair of rails 325 guided by the driving body 330. The pair of rails 325 may be positioned on the second inner side surface 323. The pair of rails 325 may be separated by a gap from each other and form at least a portion of the second duct D2. Meanwhile, the pair of rails 325 may perform sealing so that the sound radiated along the second duct D2 may be radiated substantially to the first duct D1.

In an embodiment, the second housing 320 may include a first support structure 326 and/or a second support structure 327. The first support structure 326 may surround at least a portion of the sound unit 355 and support at least a partial area (e.g., a partial area of a bottom surface) of the display 361. The second support structure 327 may surround at least a portion of the sound unit 355 and support the sound unit 355 (e.g., the enclosure 357). The first support structure 326 and/or the second support structure 327 may perform sealing so that a sound may be radiated through the second duct D2.

In an embodiment, the driving body 330 may include a rolling shaft 331 for moving the second housing 320 relative to the first housing 310 and a rolling coupler 332 (e.g., a rotary bearing) for coupling the rolling shaft 331 to the second housing 320. In an embodiment, the rolling shaft 331 may be positioned between the first wall 3221 and the second wall 3222. In an embodiment, the rolling shaft 331 may contact the pair of rails 325 and rotate while guiding the pair of rails 325. By the rotation of the rolling shaft 331, the electronic device 301 may change in state from the closed state to the open state in which the second housing 320 moves relative to the first housing 310. Meanwhile, the driving body 330 is not limited to the illustrated embodiment, and may be implemented by various driving means (e.g., elastic driving, hydraulic driving) for moving the second housing 320 with respect to the first housing 310.

In an embodiment, the sound unit 355 may be positioned in the second housing 320. The sound unit 355 may be configured to output a sound toward the second outer side surface 322 and the second inner side surface 323 (e.g., radiate laterally, radiate in the −Y direction) or receive a sound radiated from the outside toward the second outer side surface 322 and the second inner side surface 323. In an embodiment, the sound unit 355 may include a circuit board 356 for outputting a sound signal to the outside of the electronic device 301 or receiving a sound signal from the outside of the electronic device 301 and an enclosure 357 surrounding the circuit board 356. The enclosure 357 may be at least partially surrounded by the first support structure 326 and the second support structure 327. Meanwhile, the sound unit 355 is not limited to the illustrated embodiment, and may be implemented in various shapes and/or forms. For example, although the enclosure 357 surrounds the circuit board 356 while defining a resonant space in the illustrated embodiment, the circuit board 356 may be positioned on one surface (e.g., a bottom surface) of the enclosure 357, or the enclosure 357 may have a structure that substantially surrounds the circuit board 356 without a resonant space.

According to the operation of the electronic device 301 according to an embodiment in which the sound unit 355 includes a sound output module, in the closed state of the electronic device 301, a sound output by the sound unit 355 may be radiated in a first direction (e.g., radiated laterally, radiated in the −Y direction) through the second duct D2, and the sound in the second duct D2 may be radiated in a second direction of the electronic device 301 (e.g., radiated upward, radiated in the +Z direction, radiated in the +Y direction, and/or radiated about 45 degrees on a YZ plane) through the first duct D1 connected to the second duct D2 so that the first duct D1 and the second duct D2 form a sound radiation path. Meanwhile, in the open state of the electronic device 301, the sound output by the sound unit 355 may be radiated in the first direction through the second duct D2 and radiated to the outside of the electronic device 301 connected with the second duct D2.

According to the operation of the electronic device 301 according to an embodiment in which the sound unit 355 includes an audio module, a sound (e.g., a sound of a user) from the outside of the electronic device 301 may be radiated through the first duct D1 in the second direction of the electronic device 301, radiated in the first direction through the second duct D2 connected to the first duct D1, and input to the sound unit 355.

Figure 4A:
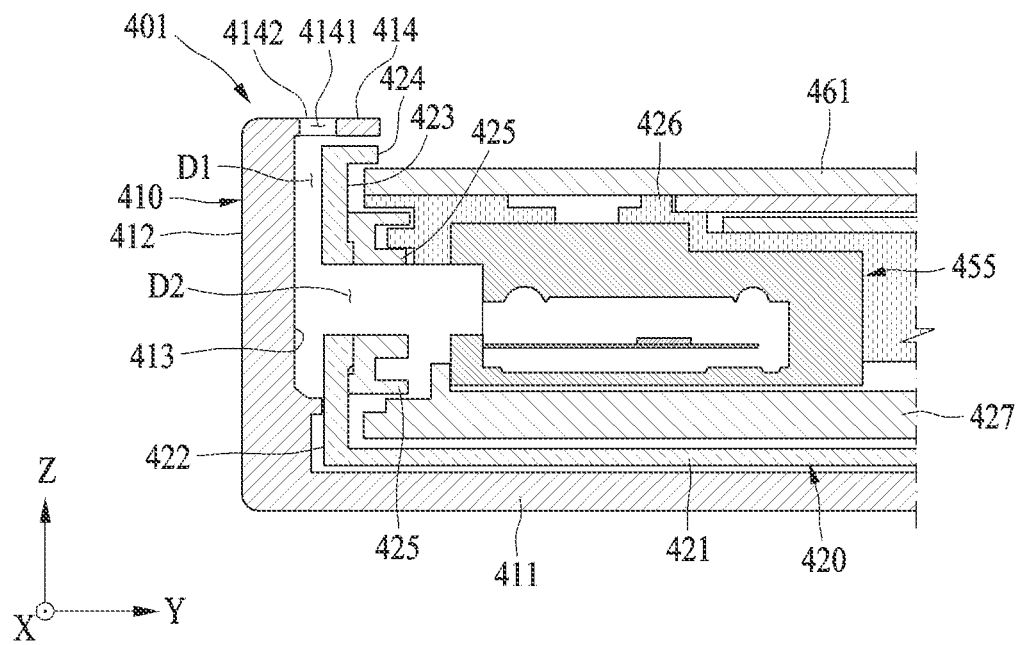
FIG. 4A is a cross-sectional view of an electronic device in a closed state, viewed along a line A-A of FIG. 2A, according to an embodiment of the disclosure.
Figure 4B:
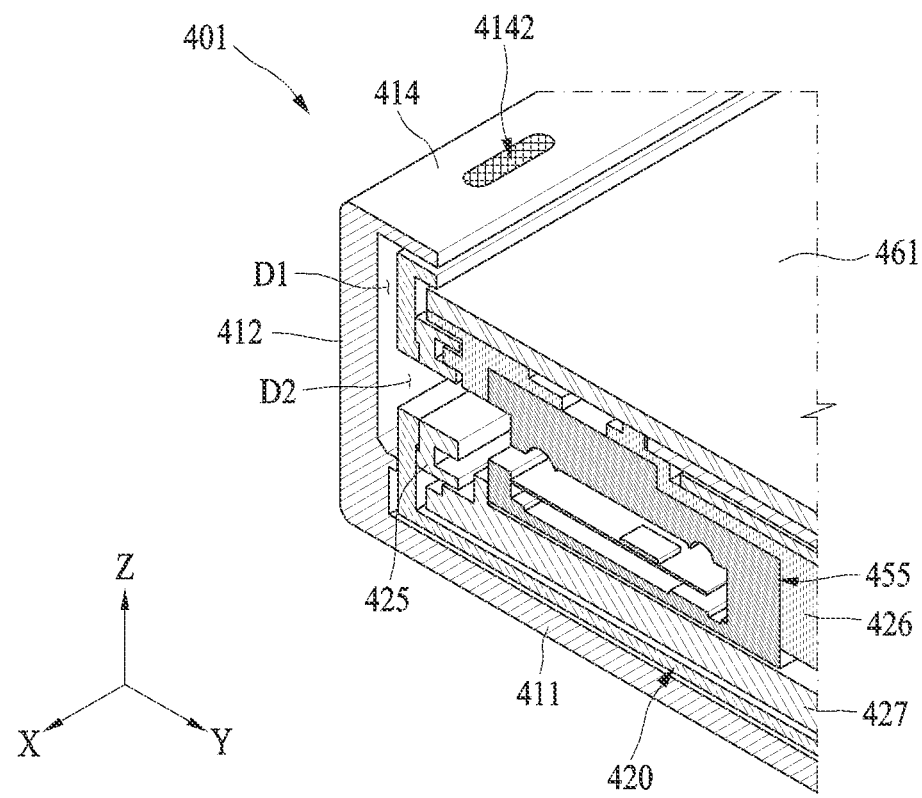
FIG. 4B is a cross-sectional perspective view of an electronic device in a closed state, viewed along a line A-A of FIG. 2A, according to an embodiment of the disclosure.

FIG. 4A is a cross-sectional view of an electronic device in a closed state, viewed along a line A-A of FIG. 2A, according to an embodiment of the disclosure, and FIG. 4B is a cross-sectional perspective view of the electronic device in the closed state, viewed along the line A-A of FIG. 2A, according to an embodiment of the disclosure.

Referring to FIGS. 4A and 4B, an electronic device 401 (e.g., the electronic device 301 of FIGS. 3A to 3F) according to an embodiment may include a first housing 410 (e.g., the first housing 310 of FIG. 3A), a second housing 420 (e.g., the second housing 320 of FIGS. 3C, 3D, and 3F), a driving body (e.g., the driving body 330 of FIG. 3A), a sound unit 455 (e.g., the sound unit 355 of FIGS. 3C to 3F), and a display 461 (e.g., the display 361 of FIGS. 3A to 3F). The first housing 410 may include a first surface 411 (e.g., the first surface 311 of FIGS. 3A to 3F), a plurality of first outer side surfaces 412 (e.g., the first outer side surfaces 312 of FIGS. 3A to 3F), a plurality of first inner side surfaces 413 (e.g., the first inner side surfaces 313 of FIGS. 3A to 3F), and at least one third surface 414 (e.g., the third surface 314 of FIGS. 3A to 3F). The second housing 420 may include a second surface 421 (e.g., the second surface 321 of FIGS. 3A to 3F), a plurality of second outer side surfaces 422 (e.g., the second outer side surfaces 322 of FIGS. 3A to 3F), a plurality of second inner side surfaces 423 (e.g., the second inner side surfaces 323 of FIGS. 3A to 3F), and at least one fourth surface 424 (e.g., the fourth surface 324 of FIGS. 3A to 3F). In an embodiment, the electronic device 401 may include a pair of rails 425 (e.g., the rails 325 in FIGS. 3A to 3F), a first support structure 426 (e.g., the first support structure 326 of FIGS. 3A to 3F), and/or a second support structure 427 (e.g., the second support structure 327 of FIGS. 3A to 3F).

In an embodiment, the third surface 414 may include an opening 4141. The opening 4141 may further improve transmitter and receiver performance, for example, in a closed state of the electronic device 401 (e.g., FIGS. 3D, 4A, and 4B). In a closed state of the electronic device 401, a sound output from the sound unit 455 may be radiated through a second duct D2, and a sound radiated through a first duct D1 may be radiated in one direction of the electronic device 401 (e.g., radiated upward, radiated in a +Z direction) through the opening 4141. In some embodiments, a sound radiated in a space between a first inner side surface 413 and a second outer side surface 422 forming at least a portion of the first duct D1 may also be radiated through a space between the third surface 414 and the fourth surface 424, in addition to the opening 4141. In an embodiment, the space between the third surface 414 and the fourth surface 424 may be blocked substantially for a sound, such that a sound radiated from the space between the first inner side surface 413 and the second outer side surface 422 may be radiated substantially through the opening 4141. In an embodiment, the opening 4141 may have a substantially circular shape, a polygonal shape, and any shape appropriate for sound radiation.

Meanwhile, the above embodiment may also apply to a case where the sound unit 455 is an audio module. For example, a sound from the outside of the electronic device 401 may enter the first duct D1 through the opening 4141, be radiated through the first duct D1, enter the second duct D2 connected to the first duct D1, be radiated through the second duct D2, and be input to the sound unit 455.

In an embodiment, the electronic device 401 may include a protective member 4142 for protecting the opening 4141. The protective member 4142 may prevent foreign material or moisture from entering the electronic device 401 through the opening 4141. For example, the protective member 4142 may have a grille structure or a mesh structure. In an embodiment, the protective member 4142 may cover at least a portion of the opening 4141. In an embodiment, the protective member 4142 may be inserted into the opening 4141. In some embodiments, the protective member 4142 may be coupled into the opening 4141.

Figure 5A:
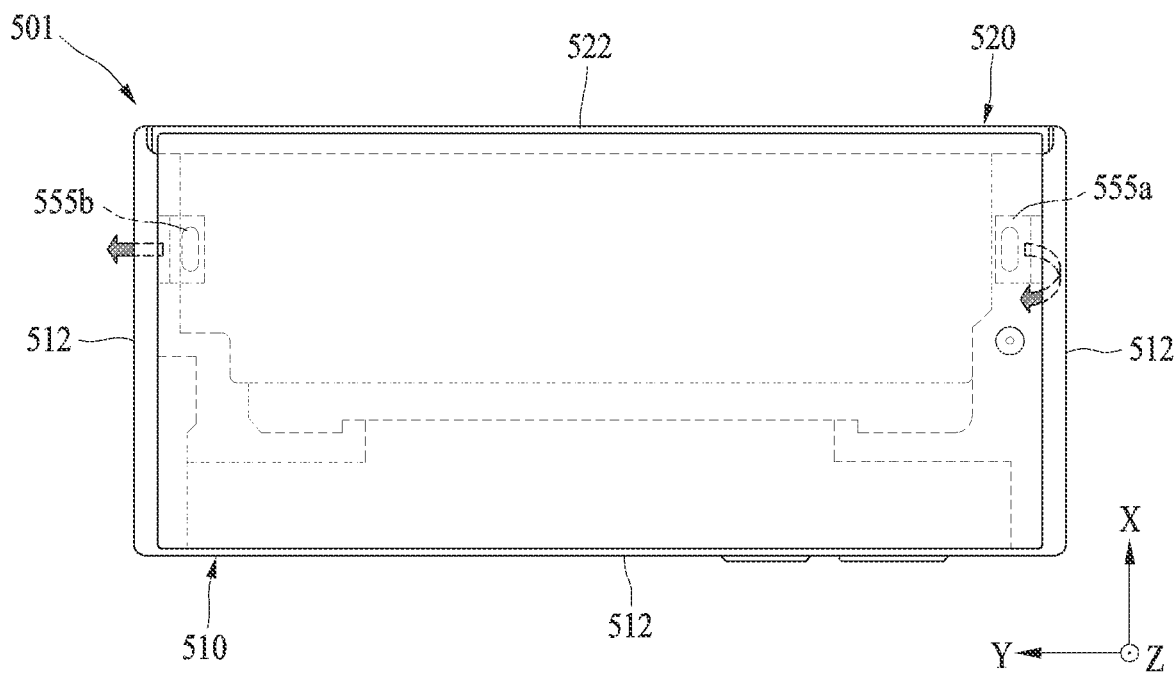
FIG. 5A is a plan view of an electronic device in a closed state according to an embodiment of the disclosure.
Figure 5B:
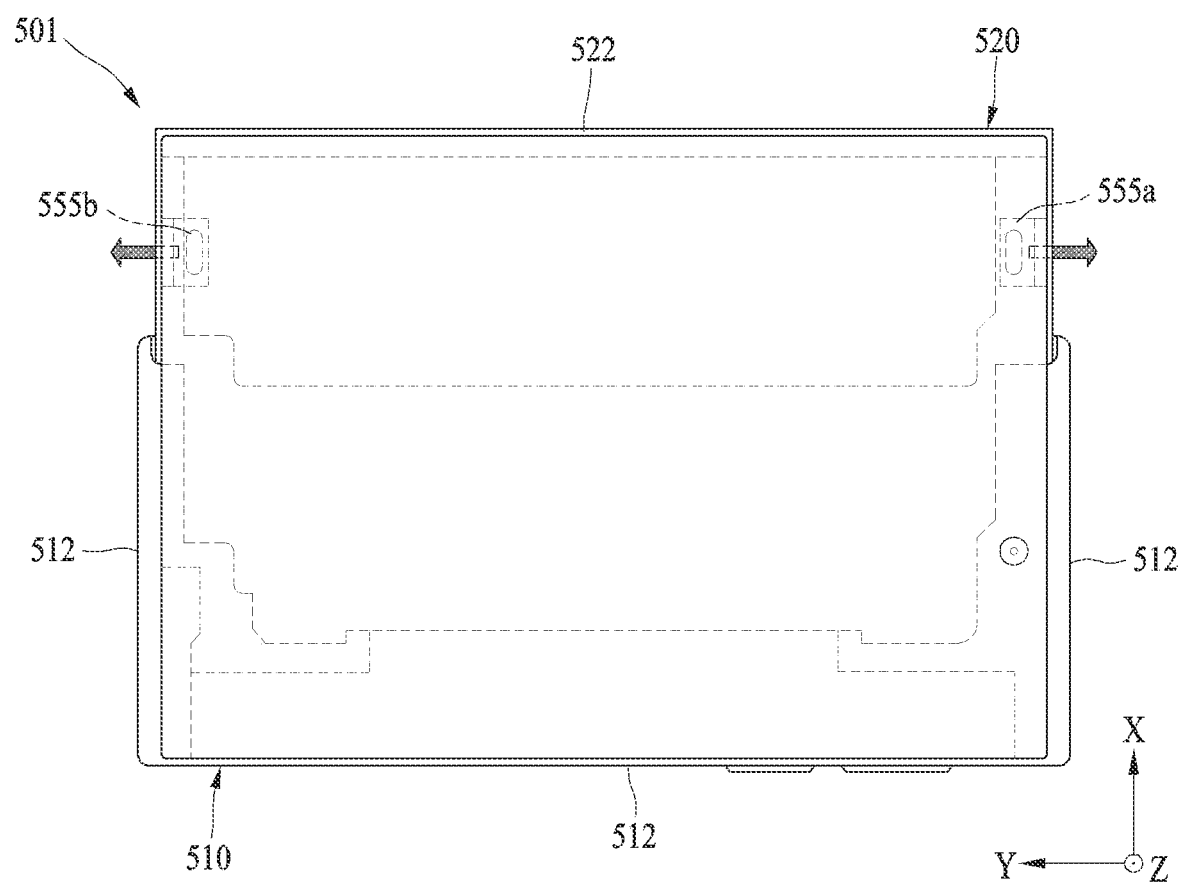
FIG. 5B is a plan view of an electronic device in an open state according to an embodiment of the disclosure.
Figure 5C:
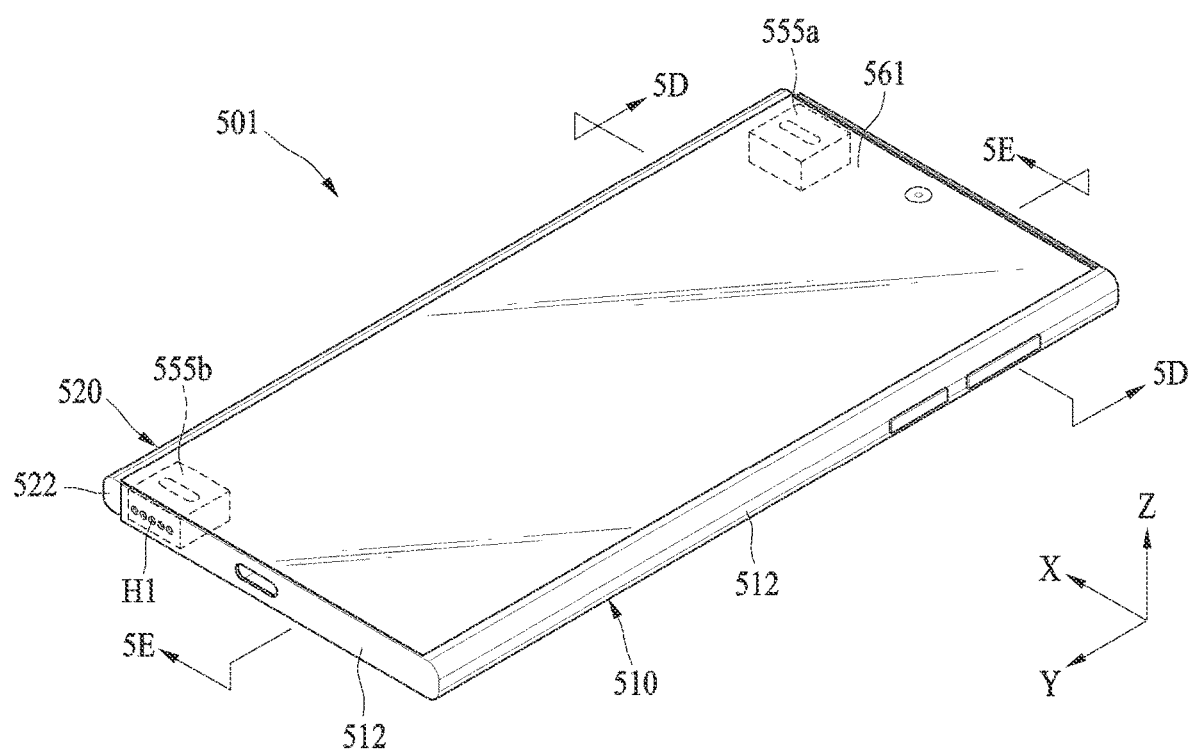
FIG. 5C is a perspective view of an electronic device according to an embodiment of the disclosure.

FIG. 5A is a plan view of an electronic device in a closed state according to an embodiment of the disclosure, FIG. 5B is a plan view of the electronic device in an open state according to an embodiment of the disclosure, and FIG. 5C is a perspective view of the electronic device according to an embodiment of the disclosure.

Referring to FIGS. 5A to 5C, an electronic device 501 (e.g., the electronic device 201 of FIGS. 2A and 2B and/or the electronic device 301 of FIGS. 3A to 3F) according to an embodiment may include a first housing 510 (e.g., the first housing 210 of FIGS. 2A and 2B and/or the first housing 310 of FIGS. 3A to 3F) including a first surface (e.g., the first surface 311 of FIGS. 3A to 3F) and a plurality of first side surfaces 512 (e.g., the first outer side surfaces 312 of FIGS. 3A to 3F), a second housing 520 (e.g., the second housing 220, 320 of FIGS. 2A to 3F) including a second surface (e.g., the second surface 321 of FIGS. 3A to 3F) and a plurality of second side surfaces 522 (e.g., the second outer side surfaces 322 of FIGS. 3A to 3F), a first sound unit 555a (e.g., the first sound unit 255a of FIGS. 2A and 2B), a second sound unit 555b (e.g., the second sound unit 255b of FIGS. 2A and 2B), and a display 561 (e.g., the display 261 of FIGS. 2A and 2B and/or the display 361 of FIGS. 3A to 3F). In an embodiment, the first sound unit 555a and the second sound unit 555b may implement a first mode (e.g., a transmitter and receiver mode and a speaker mode) and a second mode (e.g., a speaker mode and a stereo mode) according to a state of the electronic device 501.

In a closed state (e.g., FIGS. 5A and 5C) of the electronic device 501, as the first mode, a sound output by the first sound unit 555a may be radiated, as the transmitter and receiver mode, through one of the second side surfaces 522 (e.g., a second side surface in an upper portion of the electronic device 501) and toward one of the first side surfaces 512 (e.g., a first side surface in the upper portion of the electronic device 501) in a first direction (e.g., a −Y direction) and a second direction (e.g., a +Z direction) intersecting the first direction along the first side surface 512, and a sound output by the second sound unit 555b may be radiated, as the speaker mode, through a second side surface 522 (e.g., a second side surface in a lower portion of the electronic device 501) opposite to the above second side surface 522 and toward another first side surface 512 (e.g., a first side surface in the lower portion of the electronic device 501) opposite to the above first side surface 512 in a third direction (e.g., a +Y direction) substantially opposite to the first direction, for example, through a hole H1 formed in the first side surface 512.

In an open state (e.g., FIG. 5B) of the electronic device 501, as the second mode, a sound output by the first sound unit 555a may be radiated through one of the second side surfaces 522 (e.g., the second side surface in the upper portion of the electronic device 501) in the first direction (e.g., the −Y direction), and a sound output by the second sound unit 555b may be radiated through another second side surface 522 (e.g., the second side surface in the lower portion of the electronic device 501) opposite to the above side surface 522 in the third direction (e.g., the +Y direction).

Meanwhile, the above-described operation of the electronic device 501 may also apply to a case where at least one of the first sound unit 555a and the second sound unit 555b is an audio module. For example, in the closed state (e.g., FIGS. 5A and 5C) of the electronic device 501, an external sound of the electronic device 501 may be radiated in a fourth direction (e.g., a −Z direction) along one of the first side surfaces 512 (e.g., the first side surface in the upper portion of the electronic device 501), radiated in a fifth direction (e.g., the +Y direction) intersecting with the fourth direction through the first side surface 512 and a second side surface 522 (e.g., the second side surface in the upper portion of the electronic device 501), and input to the first sound unit 555a. Meanwhile, the external sound of the electronic device 501 may also be radiated in a sixth direction (e.g., the −Y direction) through another first side surface 512 (e.g., the first side surface in the lower portion of the electronic device 501) opposite to the above first side surface 512 and another second side surface 522 (e.g., the second side surface in the lower portion of the electronic device 501) opposite to the above second side surface 522, and input to the second sound unit 555b. In the open state (e.g., FIG. 5B) of the electronic device 501, an external sound of the electronic device 501 may be radiated in a seventh direction (e.g., the +Y direction) through a second side surface 522 (e.g., the second side surface in the upper portion of the electronic device 501), and input to the first sound unit 555a. Meanwhile, the external sound of the electronic device 501 may also be radiated in the sixth direction through the above another first side surface 512 and the above another second side surface 522 and input to the second sound unit 555b.

Figure 5D:
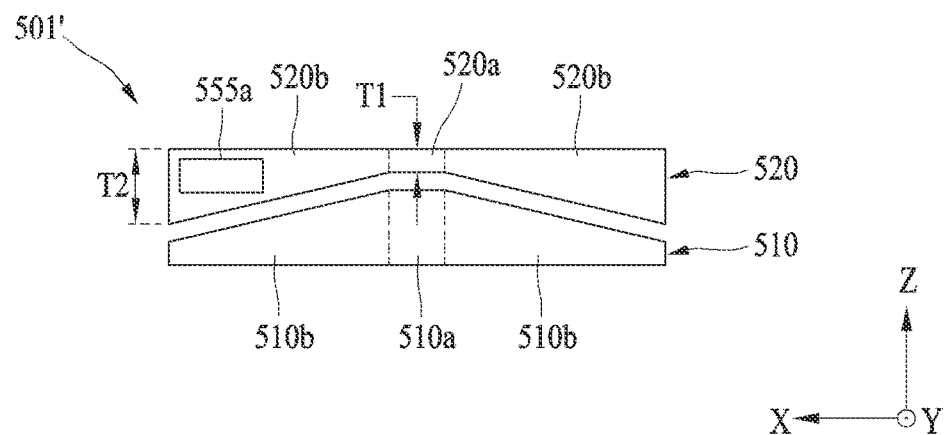
FIG. 5D is a cross-sectional view of an electronic device, viewed along a line 5D-5D of FIG. 5C, according to an embodiment of the disclosure.

FIG. 5D is a cross-sectional view of an electronic device, viewed along a line 5D-5D of FIG. 5C, according to an embodiment of the disclosure.

Referring to FIG. 5D, in an electronic device 501' according to an embodiment, the first sound unit 555a may be positioned in a locally thick portion of the second housing 520. In an embodiment, a thickness of the second housing 520 may increase from a central area 520a toward an edge area 520b of the second housing 520, and the first sound unit 555a may be positioned in a second edge area 520b. In some embodiments, the second housing 520 may include a second central area 520a having a first thickness T1 that is substantially constant and a second edge area 520b having a second thickness T2 that substantially increases. In some embodiments, the second thickness T2 may increase with a substantially constant slope. However, embodiments are not limited thereto, and an increase profile of the second thickness T2 may be determined according to a polynomial function, an exponential function, and other various functions representing increase profiles. Meanwhile, a thickness of the first housing 510 may be determined such that the shape of the first housing 510 and the shape of the second housing 520 correspond to each other. For example, the first housing 510 may include a first central area 510a having a thickness that is relatively great and a first edge area 510b having a thickness that is relatively small and decreases.

Figure 5E:
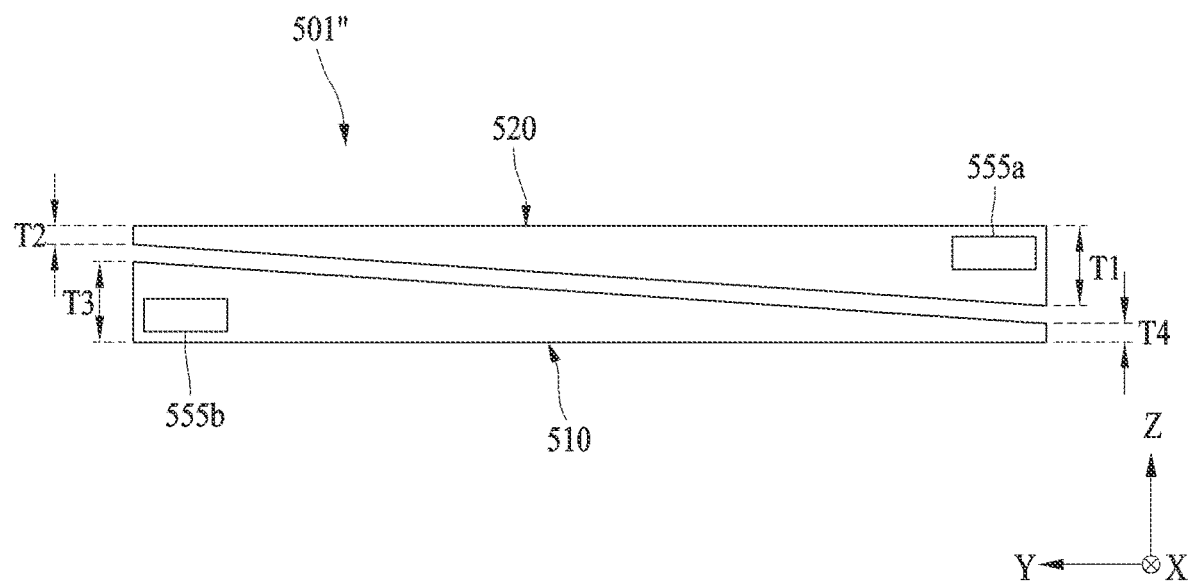
FIG. 5E is a cross-sectional view of an electronic device, viewed along a line 5E-5E of FIG. 5C, according to an embodiment of the disclosure.

FIG. 5E is a cross-sectional view of an electronic device, viewed along a line 5E-5E of FIG. 5C, according to an embodiment of the disclosure.

Referring to FIG. 5E, in an electronic device 501" according to an embodiment, the first sound unit 555a may be positioned in a locally thick portion of the second housing 520, and/or the second sound unit 555b may be positioned in a locally thick portion of the first housing 510. In an embodiment, the second housing 520 may have a structure that decreases in thickness from a first thickness T1 to a second thickness T2, which is less than the first thickness T1, in a first direction (e.g., a +Y direction) of the electronic device 501, and the first housing 510 may have a structure that decreases in thickness from a third thickness T3 to a fourth thickness T4, which is less than the third thickness T3, in a second direction (e.g., a −Y direction) opposite to the first direction of the electronic device 501. The first sound unit 555a may be positioned in an area having the first thickness T1 or in an area adjacent to the portion having the first thickness T1, and the second sound unit 555b may be positioned in an area having the third thickness T3 or in an area adjacent to the area having the third thickness T3. In an embodiment, a thickness profile of the first housing 510 and a thickness profile of the second housing 520 may be profiles (e.g., straight lines) having constant slopes. However, embodiments are not limited thereto, and the thickness profile of the first housing 510 and the thickness profile of the second housing 520 may be determined according to a polynomial function, an exponential function, and other various functions representing increase profiles.

Figure 6A:
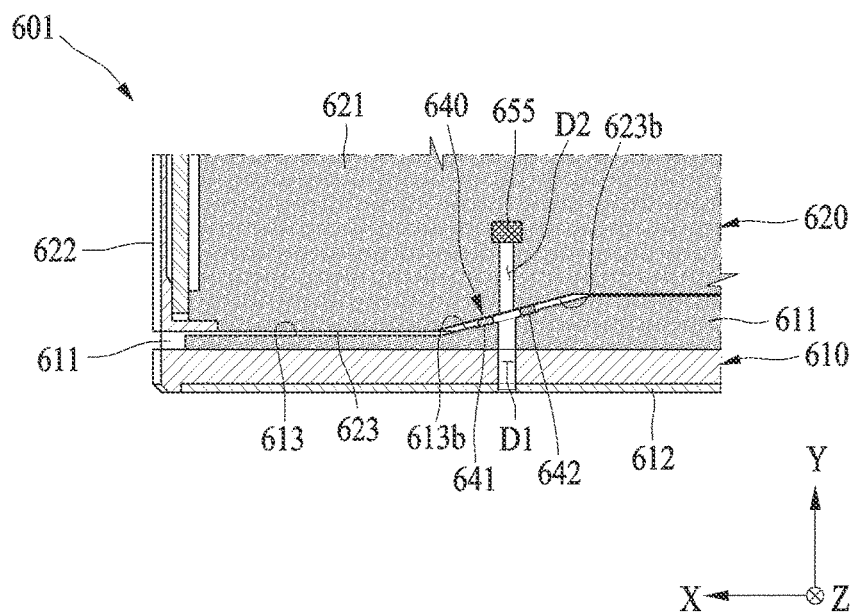
FIG. 6A is a view of an electronic device in a closed state according to an embodiment of the disclosure.
Figure 6B:
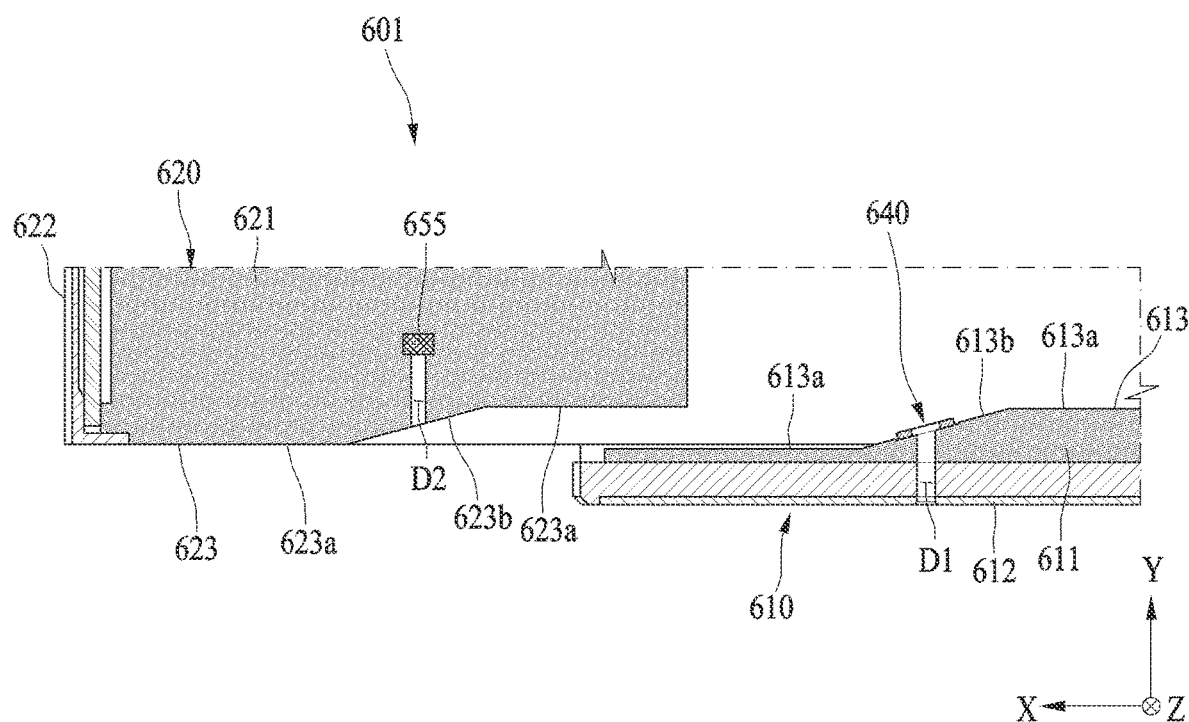
FIG. 6B is a view of an electronic device in an open state according to an embodiment of the disclosure.

FIG. 6A is a view of an electronic device in a closed state according to an embodiment of the disclosure, and FIG. 6B is a view of the electronic device in an open state according to an embodiment of the disclosure.

Referring to FIGS. 6A and 6B, an electronic device 601 (e.g., the electronic device 301) according to an embodiment may include a first housing 610 (e.g., the first housing 310 of FIGS. 3A to 3F) including a first surface 611 (e.g., the first surface 311 of FIGS. 3A to 3F), a first outer side surface 612 (e.g., the first outer side surface 312 of FIGS. 3A to 3F), and a first inner side surface 613 (e.g., the first inner side surface 313 of FIGS. 3A to 3F), a second housing 620 (e.g., the second housing 320 of FIGS. 3A to 3F) including a second surface 621 (e.g., the second surface 321 of FIGS. 3A to 3F), a second outer side surface 622 (e.g., the second outer side surface 322 of FIGS. 3A to 3F), and a second inner side surface 623 (e.g., the second inner side surface 323 of FIGS. 3A to 3F), a sound unit 655 (e.g., the sound unit 355 of FIGS. 3A to 3F), and a display (e.g., the display 361 of FIGS. 3A to 3F).

In an embodiment, the first housing 610 may include a first duct D1 formed between the first outer side surface 612 and the first inner side surface 613 and along at least a portion of the first surface 611. The second housing 620 may include a second duct D2 formed to extend between the second outer side surface 622 and the second inner side surface 623 and from the second inner side surface 623 along at least a portion of the second surface 621. The first duct D1 may be connected to the outside of the electronic device 601, and the second duct D2 may be connected to the sound unit 655 and the first duct D1. In an embodiment, the first duct D1 may be formed in another direction (e.g., the +/−Z-axial direction) not between the first outer side surface 612 and the first inner side surface 613 but along the first inner side surface 613.

In an embodiment, in a closed state (e.g., FIG. 6A) of the electronic device 601, the first duct D1 and the second duct D2 may be substantially aligned with each other, and in an open state (e.g., FIG. 6B) of the electronic device 601, the first duct D1 and the second duct D2 may not be aligned with each other.

In an embodiment, the first inner side surface 613 may include a first substantially horizontal surface 613*a* and a first inclined surface 613*b* that is inclined with respect to the first horizontal surface 613*a*. The first duct D1 may be connected to the first inclined surface 613*b*. In an embodiment, the second inner side surface 623 may include a second substantially horizontal surface 623*a* and a second inclined surface 623*b* that is inclined with respect to the second horizontal surface 623*a*. The second duct D2 may be connected to the second inclined surface 623*b*. In an embodiment, the first horizontal surface 613*a* and the second horizontal surface 623*a* may be substantially parallel to each other. In an embodiment, the first inclined surface 613*b* and the second inclined surface 623*b* may be substantially parallel to each other. In an embodiment, the first horizontal surface 613*a* and the second horizontal surface 623*a* may face each other. In an embodiment, the first inclined surface 613*b* and the second inclined surface 623*b* may face each other. In an embodiment, an inclination angle of the first inclined surface 613*b* may be substantially the same as an inclination angle of the second inclined surface 623*b*.

In some embodiments, the first inclined surface 613*b* may be positioned between a pair of first substantially horizontal surfaces 613*a*. In some embodiments, the second inclined surface 623*b* may be positioned between a pair of second substantially horizontal surfaces 623*a*.

In some embodiments, the first inner side surface 613 may include a plurality of first inclined surfaces 613*b*. In some embodiments, the second inner side surface 623 may include a plurality of second inclined surfaces 623*b*. The plurality of first inclined surfaces 613*b* may face the plurality of second inclined surfaces 623*b*, respectively.

In an embodiment, the first inclined surface 613*b* and the second inclined surface 623*b* may be inclined with respect to one surface (e.g., a side surface, a YZ plane, or an XZ plane) of the electronic device 601. In another embodiment, the first inclined surface 613*b* and the second inclined surface 623*b* may be inclined with respect to the other surface (e.g., a front surface, an XY plane) of the electronic device 601.

In an embodiment, the electronic device 601 may include a sealing portion 640 for delaying or suppressing radiation of a sound through a sound passage that is formed by a gap interposed between the first inner side surface 613 and the second inner side surface 623. The sealing portion 640 may seal a connecting duct or joint between the first duct D1 and the second duct D2 such that a sound output from the sound unit 655 may be radiated substantially through the second duct D2 and the first duct D1 to the outside of the electronic device 601, in the closed state of the electronic device 601.

In an embodiment, the sealing portion 640 may have a first form (e.g., a compressed form) in the closed state (e.g., FIG. 6A) of the electronic device 601, and have a second form (e.g., an expanded form) different from the first form in the open state (e.g., FIG. 6B) of the electronic device 601. In an embodiment, the sealing portion 640 may maintain the form that is compressed by the closing of the electronic device 601, for example, and deform and return to its original by the opening of the electronic device 601. In an embodiment, the sealing portion 640 may be formed of a compressive material. For example, the compressive material may be a sponge, rubber, silicone, any other suitable compressive materials, and/or a combination thereof.

In an embodiment, the sealing portion 640 may include a single sealing member (e.g., an O-ring). In another embodiment, the sealing portion 640 may include a first sealing portion 641 positioned on a first side (e.g., a left side) from the connecting duct or joint of the first duct D1 and the second duct D2 to seal the first side, and a second sealing portion 642 positioned on a second side (e.g., a right side) opposite to the first side to seal the second side.

In an embodiment, the sealing portion 640 may be positioned on the first inclined surface 613*b*. In another embodiment, the sealing portion 640 may be positioned on the second inclined surface 623*b*. In some embodiments, the sealing portion 640 may be positioned between the first inclined surface 613*b* and the second inclined surface 623*b*. In still another embodiment, the electronic device 601 may include a pair of sealing portions 640 positioned on the first inclined surface 613*b* and the second inclined surface 623*b*, respectively. In yet another embodiment, the electronic device 601 may include a plurality of sealing portions 640 arranged between the first inner side surface 613 and the second inner side surface 623 such that a sound may be radiated substantially through the first duct D1 and the second duct D2.

Figure 7A:
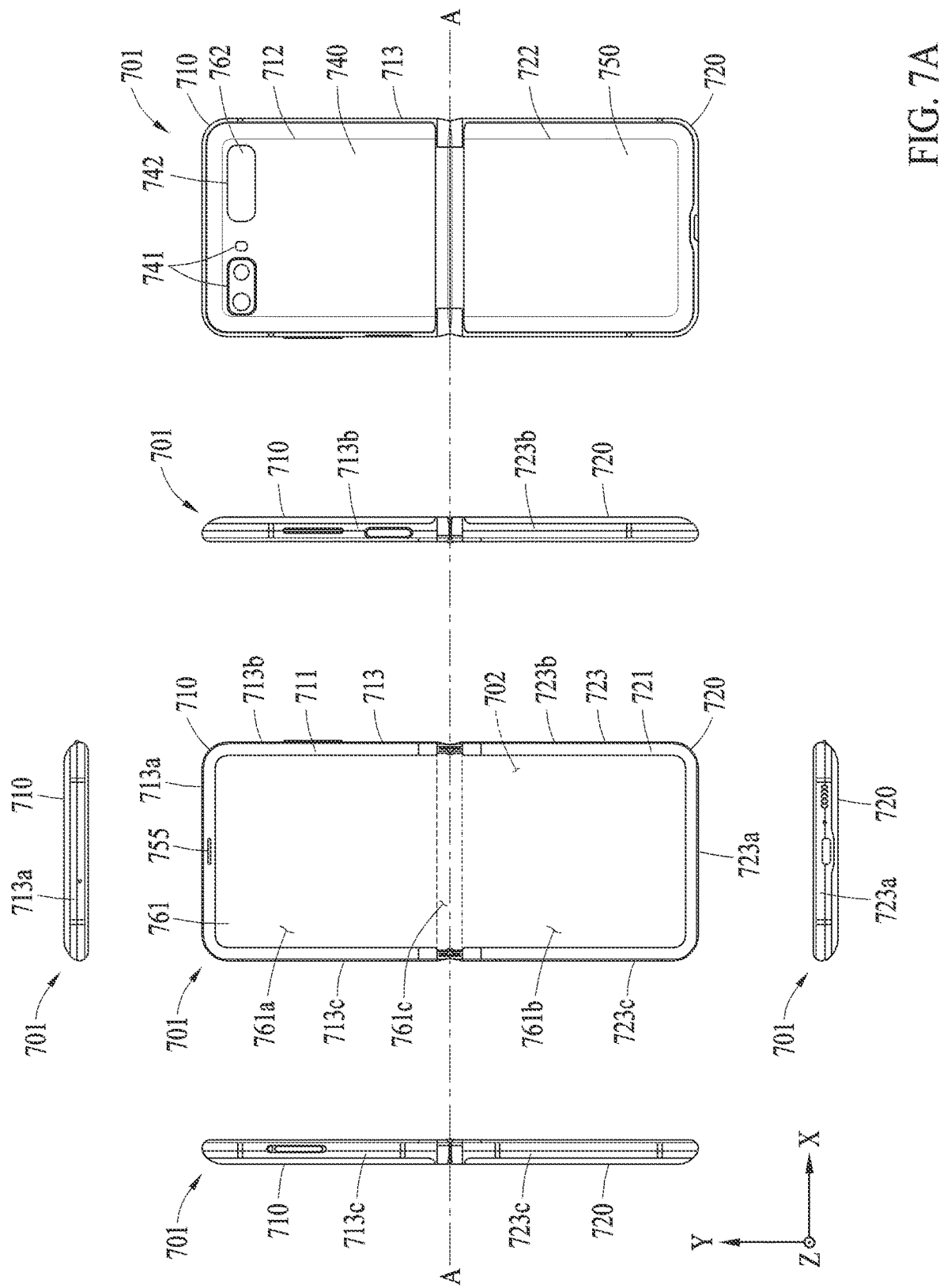
FIG. 7A is a view of an electronic device in an unfolded state according to an embodiment of the disclosure.
Figure 7B:
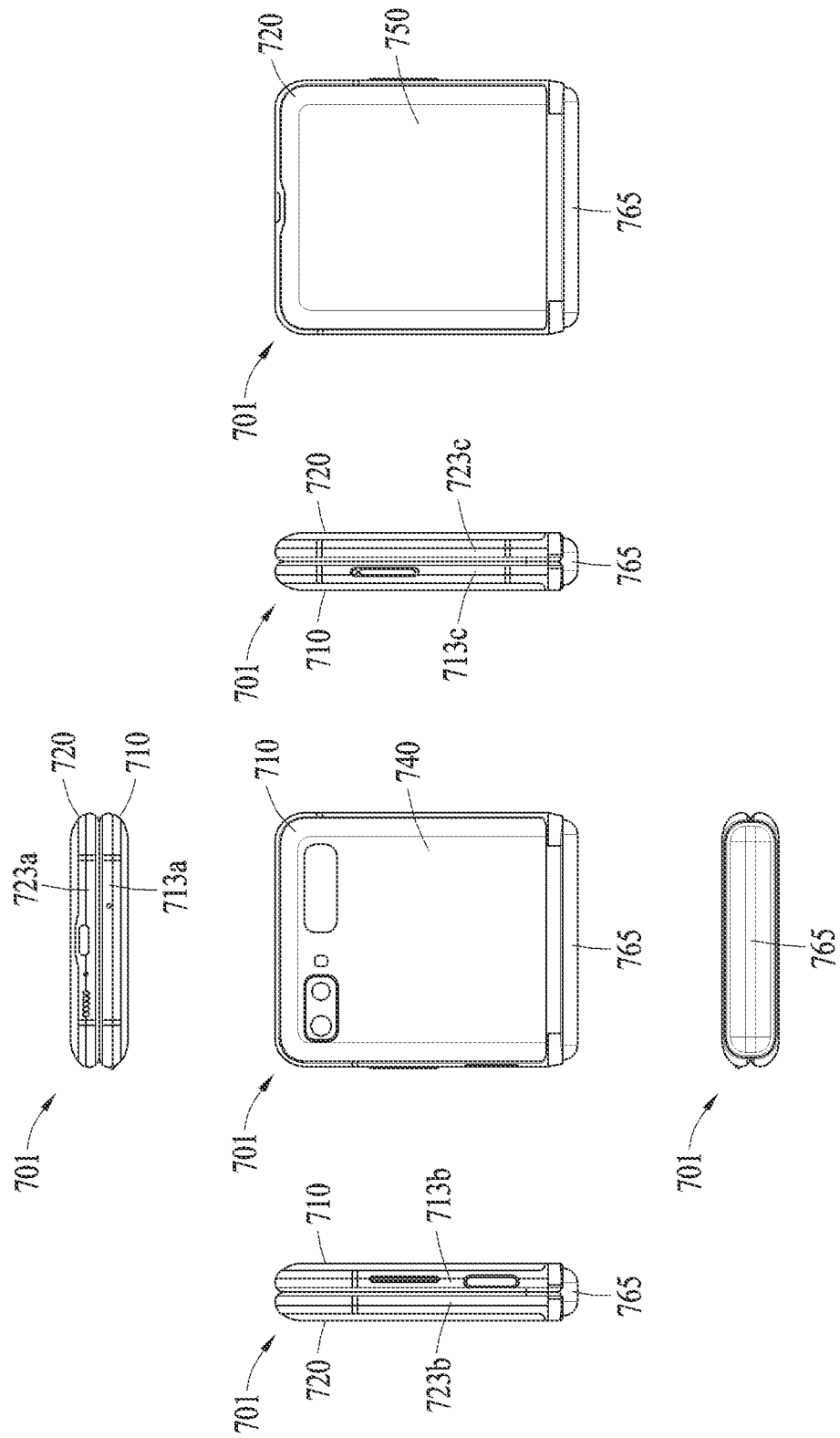
FIG. 7B is a view of an electronic device in a folded state according to an embodiment of the disclosure.

FIG. 7A is a view of an electronic device in an unfolded state according to an embodiment of the disclosure, and FIG. 7B is a view of the electronic device in a folded state according to an embodiment of the disclosure.

Referring to FIGS. 7A and 7B, a foldable electronic device 701 according to an embodiment may include a pair of housings 710 and 720 (e.g., the first housing 310 and the second housing 320 of FIGS. 3A to 3F) rotatably coupled to each other through a hinge structure to be folded with respect to each other, a hinge cover 765 for covering foldable portions of the pair of housings 710 and 720, and a display 761 (e.g., a flexible display or a foldable display, the display 361) disposed in a space formed by the pair of housings 710 and 720. In the disclosure, a surface on which the display 761 is disposed may be defined as a front surface of the foldable electronic device 701, and a surface opposite to the front surface may be defined as a rear surface of the foldable electronic device 701. In addition, a surface surrounding a space between the front surface and the rear surface may be defined as a side surface of the foldable electronic device 701.

In an embodiment, the pair of housings 710 and 720 may include a first housing 710, a second housing 720, a first rear cover 740, and a second rear cover 750. The pair of housings 710 and 720 of the electronic device 701 are not limited to the shapes or the combination and/or coupling of components shown in FIGS. 7A and 7B, and may be implemented in other shapes or by another combination and/or coupling of components.

In an embodiment, the first housing 710 and the second housing 720 may be disposed on both sides (e.g., an upper portion and a lower portion) with respect to a folding axis A, and may be disposed substantially symmetrically with respect to the folding axis A. In an embodiment, an angle or distance between the first housing 710 and the second housing 720 may vary depending on whether the electronic device 701 is in an unfolded state, a folded state, or an intermediate state.

In an embodiment, the first housing 710 may be connected to a hinge structure in the unfolded state of the electronic device 701. The first housing 710 may include a first surface 711 facing the front surface of the electronic device 701, a second surface 712 facing a direction opposite to the first surface 711, and a first side portion 713 enclosing at least a portion of a space between the first surface 711 and the second surface 712. The first side member 713 may include a first side surface 713a disposed substantially in parallel with a folding axis A, a second side surface 713b extending in a direction substantially perpendicular to the folding axis A from one end of the first side surface 713a, and a third side surface 713c extending in a direction substantially perpendicular to the folding axis A from another end of the first side surface 713a and substantially parallel to the second side surface 713b. The second housing 720 may be connected to the hinge structure in the unfolded state of the electronic device 701. The second housing 720 may include a third surface 721 facing the front surface of the electronic device 701, a fourth surface 722 facing a direction opposite to the third surface 721, and a second side portion 723 enclosing at least a portion of a space between the third surface 721 and the fourth surface 722. The second side member 723 may include a fourth surface 723a disposed substantially in parallel with the folding axis A, a fifth side surface 723b extending in a direction substantially perpendicular to the folding axis A from one end of the fourth surface 723a, and a sixth side surface 723c extending in a direction substantially perpendicular to the folding axis A from another end of the fourth surface 723a and substantially parallel to the fifth side surface 723b. The first surface 711 and the third surface 721 may face each other when the electronic device 701 is in the folded state.

In an embodiment, the electronic device 701 may include a recessed accommodating portion 702 for accommodating the display 761 through the structural coupling of the first housing 710 and the second housing 720. The accommodating portion 702 may have substantially the same size as the display 761.

In an embodiment, at least a portion of the first housing 710 and the second housing 720 may be formed of a metal material or a non-metal material having a predetermined magnitude of rigidity appropriate to support the display 761.

In an embodiment, the electronic device 701 may include a sound unit 755 (e.g., the sound output module 155 or the audio module 170 of FIG. 1) disposed through at least a partial area of the first surface 711.

In an embodiment, the first rear cover 740 may be disposed on the second surface 712 of the first housing 710, and may have a substantially rectangular periphery. At least a portion of the periphery of the first rear cover 740 may be surrounded by the first housing 710. The second rear cover 750 may be disposed on the fourth surface 722 of the second housing 720, and may have a substantially rectangular periphery. At least a portion of the periphery of the second rear cover 750 may be surrounded by the second housing 720.

In an embodiment, the first rear cover 740 and the second rear cover 750 may have substantially symmetrical shapes with respect to the folding axis A. In another embodiment, the first rear cover 740 and the second rear cover 750 may have different shapes. In still another embodiment, the first housing 710 and the first rear cover 740 may be integrally formed, and the second housing 720 and the second rear cover 750 may be integrally formed.

In an embodiment, the first housing 710, the second housing 720, the first rear cover 740, and the second rear cover 750 may provide a space in which various components (e.g., a PCB, the antenna module 197, the sensor module 176, or the battery 189) of the electronic device 701 may be arranged through a structure in which the first housing 710, the second housing 720, the first rear cover 740, and the second rear cover 750 are coupled to one another. In an embodiment, at least one component may be visually exposed on the rear surface of the electronic device 701. For example, at least one component may be visually exposed through a first rear area 741 of the first rear cover 740. Here, the component may include a proximity sensor, a rear camera module, and/or a flash. In an embodiment, at least a portion of a sub-display 762 may be visually exposed through a second rear area 742 of the first rear cover 740.

In an embodiment, the display 761 may be disposed in the accommodating portion 702 formed by the pair of housings 710 and 720. For example, the display 761 may be arranged to occupy substantially most of the front surface of the electronic device 701. The front surface of the electronic device 701 may include an area in which the display 761 is disposed, and a partial area (e.g., a periphery area) of the first housing 710 and a partial area (e.g., a periphery area) of the second housing 720, which are adjacent to the display 761. The rear surface of the electronic device 701 may include the first rear cover 740, a partial area (e.g., a periphery area) of the first housing 710 adjacent to the first rear cover 740, the second rear cover 750, and a partial area (e.g., a periphery area) of the second housing 720 adjacent to the second rear cover 750. In an embodiment, the display 761 may be a display with at least a partial area deformable into a planar surface or a curved surface. In an embodiment, the display 761 may include a folding area 761c, a first area 761a on a first side (e.g., an upper portion) of the folding area 761c, and a second area 761b on a second side (e.g., a lower portion) of the folding area 761c. For example, the first area 761a may be positioned on the first surface 711 of the first housing 710, and the second area 761b may be positioned on the third surface 721 of the second housing 720. However, the area division of the display 761 is merely an example, and the display 761 may be divided into a plurality of areas depending on the structure or functions of the display 761. For example, as shown in FIG. 7A, the display 761 may be divided into areas based on the folding axis A or the folding area 761c extending in parallel to an X-axis, or the display 761 may be divided into areas based on another folding area (e.g., a folding area extending in parallel to a Y-axis) or another folding axis (e.g., a folding axis parallel to the Y-axis). The area division of the display 761 as above is merely physical division based on the pair of housings 710 and 720 and the hinge structure, and the display 761 may display substantially one screen through the pair of housings 710 and 720 and the hinge structure. In an embodiment, the first area 761a and the second area 761b may have substantially symmetrical shapes with respect to the folding area 761c.

In an embodiment, the hinge cover 765 may be disposed between the first housing 710 and the second housing 720 and configured to cover the hinge structure. The hinge cover 765 may be hidden by at least a portion of the first housing 710 and the second housing 720 or exposed to the outside according to the operational state of the electronic device 701. For example, when the electronic device 701 is in an unfolded state as shown in FIG. 7A, the hinge cover 765 may be hidden by the first housing 710 and the second housing 720 and not exposed to the outside, and when the electronic device 701 is in a folded state as shown in FIG. 7B, the hinge cover 765 may be exposed to the outside between the first housing 710 and the second housing 720. Meanwhile, when the electronic device 701 is in an intermediate state in which the first housing 710 and the second housing 720 form an angle with each other, at least a portion of the hinge cover 765 may be exposed to the outside between the first housing 710 and the second housing 720.

In this case, an area of the hinge cover 765 exposed to the outside may be smaller than the area of the hinge cover 765 exposed when the electronic device 701 is in the folded state. In an embodiment, the hinge cover 765 may have curved surfaces.

Describing the operation of the electronic device 701 according to an embodiment, when the electronic device 701 is in an unfolded state (e.g., the state of the electronic device 701 of FIG. 7A), the first housing 710 and the second housing 720 may form a first angle (e.g., about 180 degrees) with each other, and the first area 761a and the second area 761b of the display 761 may be oriented in substantially the same direction. The folded area 761c of the display 761 may be on substantially the same plane as the first area 761a and the second area 761b. In an embodiment, when the electronic device 701 is in the unfolded state, the first housing 710 may rotate at a second angle (e.g., about 360 degrees) relative to the second housing 720, whereby the first housing 710 and the second housing 720 may be reversely folded such that the second surface 712 and the fourth surface 722 may face each other. Meanwhile, when the electronic device 701 is in the folded state (e.g., the state of the electronic device 701 of FIG. 7B), the first housing 710 and the second housing 720 may face each other. The first housing 710 and the second housing 720 may form an angle of about 0 degrees to about 10 degrees, and the first area 761a and the second area 761b of the display 761 may face each other. At least a portion of the folding area 761c of the display 761 may be deformed into a curved surface. Meanwhile, when the electronic device 701 is in the intermediate state, the first housing 710 and the second housing 720 may form a predetermined angle with each other. An angle (e.g., a third angle, about 90 degrees) formed by the first area 761a and the second area 761b of the display 761 may be greater than that when the electronic device 701 is in the folded state and less than that when the electronic device 701 is in the unfolded state. At least a portion of the folding area 761c of the display 761 may be deformed into a curved surface. In this case, a curvature of the curved surface of the folding area 761c may be smaller than that when the electronic device 701 is in the folded state.

Figure 8A:
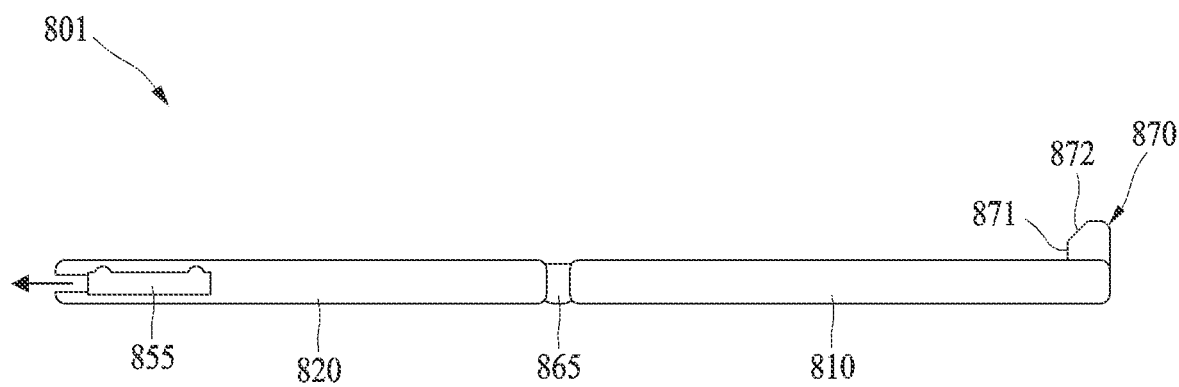
FIG. 8A is a side view of an electronic device in an unfolded state according to an embodiment of the disclosure.
Figure 8B:
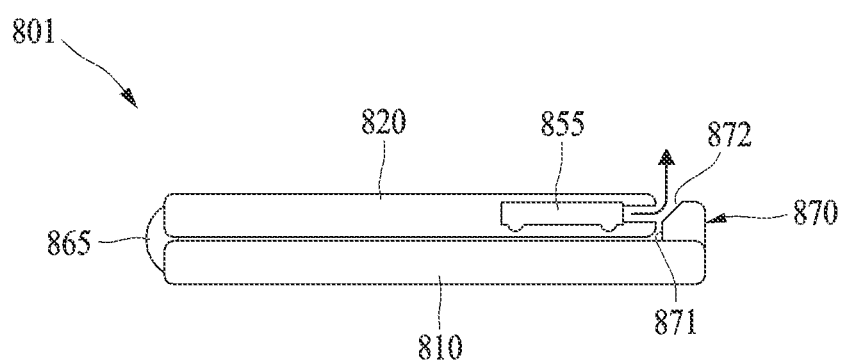
FIG. 8B is a side view of an electronic device in a folded state according to an embodiment of the disclosure.

FIG. 8A is a side view of an electronic device in an unfolded state according to an embodiment of the disclosure, and FIG. 8B is a side view of the electronic device in a folded state according to an embodiment of the disclosure.

Referring to FIGS. 8A and 8B, an electronic device 801 (e.g., the electronic device 701 of FIGS. 7A and 7B) according to an embodiment may include a first housing 810 (e.g., the first housing 710 of FIGS. 7A and 7B), a second housing 820 (e.g., the second housing 720 of FIGS. 7A and 7B), a hinge cover 865 (e.g., the hinge cover 765 of FIGS. 7A and 7B), and a display (e.g., the display 761 of FIGS. 7A and 7B).

In an embodiment, the electronic device 801 may include a sound unit 855 positioned in the second housing 820. A sound output by the sound unit 855 may be radiated through one surface (e.g., a side surface) of the second housing 820.

In an embodiment, in a folded state (e.g., a closed state, FIG. 8B) of the electronic device 801, the electronic device 801 may include a waveguide 870 for switching a direction in which the sound output by the sound unit 855 is radiated (e.g., a lateral direction) to another direction (e.g., an upward direction). In an embodiment, the waveguide 870 may be positioned in the first housing 810. For example, the waveguide 870 may be positioned in an edge area of the first housing 810 (e.g., an edge area or an upper edge area on the first surface 711 adjacent to the first side surface 713a of FIGS. 7A and 7B).

In an embodiment, the waveguide 870 may include a first guide surface 871 extending from the first housing 810 in a first direction (e.g., a vertical direction). The first guide surface 871 may extend in a normal direction of the display (e.g., the first area 761a of the display 761 of FIGS. 7A and 7B).

In an embodiment, the waveguide 870 may further include a second guide surface 872 connected to the first guide surface 871 and inclined with respect to the first guide surface 871. The second guide surface 872 may extend in a direction (e.g., a direction at about 45 degrees) intersecting with the normal direction of the display (e.g., the first area 761a of the display 761 of FIGS. 7A and 7B). In another embodiment, the second guide surface 872 may be substantially perpendicular to the first guide surface 871.

Meanwhile, the embodiments as above may also apply to a case where the sound unit 855 is an audio module. For example, in an unfolded state (e.g., FIG. 8A) of the electronic device 801, an external sound of the electronic device 801 may be radiated (e.g., radiated laterally) in one direction through the second housing 820 and input to the sound unit 855, whereas in the folded state (e.g., FIG. 8B) of the electronic device 801, the external sound may be radiated (e.g., radiated downward) in another direction along the waveguide 870, radiated (e.g., radiated laterally) in one direction through the second housing 820, and input to the sound unit 855.

According to various embodiments, an electronic device 301 may include: a first housing 310 including a first surface 311 and a first side surface 313 connected to the first surface 311, a second housing 320 including a second surface 321 and a second side surface 322 connected to the second surface 321, the second housing 320 configured to move relative to the first housing 310 between a closed state in which the second surface 321 faces the first surface 311 and the second side surface 322 faces the first side surface 313 and an open state in which the second surface 321 moves along the first surface 311 and the second side surface 322 moves along the first side surface 313, a display 361 positioned on an opposite side of the first surface 311 and an opposite side of the second surface 321, the display 361 having a first area in the closed state and having a second area greater than the first area in the open state, and a sound unit 355 configured to output or receive a sound, the sound unit 355 positioned in the second housing 320 such that the sound is radiated in a first direction through the second side surface 322 in the open state and radiated in a second direction different from the first direction along the first side surface 313 in the closed state.

In an embodiment, the second side surface 322 may include: a first wall 3221 connected to the first surface 311, and a second wall 3222 forming a gap through which the output sound passes, the second wall 3222 separated from the first wall 3221.

In an embodiment, the gap may include a slit S extending along the second side surface 322.

In an embodiment, the first housing 310 may further include a recess 315 formed on the first side surface 313, wherein the recess 315 may guide the sound between the first side surface 313 and the second side surface 322 in the closed state.

In an embodiment, the first housing 310 may further include a third surface 314 positioned opposite the first surface 311 and connected to the first side surface 313, wherein the third surface 314 may guide the sound radiated along the first side surface 313 in the closed state.

In an embodiment, the third surface 314 may at least partially overlap an edge area of the display 361.

In an embodiment, the second housing 320 may further include a fourth surface 324 positioned opposite the second surface 321 and connected to the second side surface 322, wherein the fourth surface 324 and the third surface 314 may form a gap and guide the sound together.

In an embodiment, the fourth surface 324 may at least partially overlap an edge area of the display 361.

In an embodiment, the third surface 314 and the fourth surface 324 may be substantially parallel.

In an embodiment, the first housing 410 may further include an opening 4141 formed in the third surface 414, wherein the opening 4141 may be configured to radiate the sound radiated along the first side surface 413 to an outside or radiate an external sound of the electronic device 401 along the first side surface 413 to an inside of the electronic device 401, in the closed state.

According to various embodiments, an electronic device 601 may include: a first housing 610 including a first surface 611, a first side surface 613 connected to the first surface 611, and a first duct D1 connected to the first side surface 613, a second housing 620 including a second surface 621, a second side surface 623 connected to the second surface 621, and a second duct D2 connected to the second side surface 623, the second housing 620 configured to move relative to the first housing 610 between a closed state in which the second surface 621 faces the first surface 611, the second side surface 623 faces the first side surface 613, and the first duct D1 and the second duct D2 are aligned and an open state in which the second surface 621 moves along the first surface 611, the second side surface 623 moves along the first side surface 613, and the first duct D1 and the second duct D2 are not aligned, a display positioned on an opposite side of the first surface 611 and an opposite side of the second surface 621, the display having a first area in the closed state and having a second area greater than the first area in the open state, a sound unit 655 positioned in the second housing 620, connected to the second duct D2, and configured to output or receive a sound, and a sealing portion 640 positioned between the first side surface 613 and the second side surface 623 and around the first duct D1 and the second duct D2.

In an embodiment, a connecting duct may be formed between the first duct D1 and the second duct D2 in the closed state, wherein the sealing portion 640 may include: a first sealing portion 641 positioned on a first side of the connecting duct, and a second sealing portion 642 positioned on a second side, opposite to the first side, of the connecting duct.

In an embodiment, the sealing portion 640 may be deformable to have a first shape in the closed state and have a second shape different from the first shape in the open state.

In an embodiment, the first side surface 613 may include a first inclined surface 613b, and the second side surface 623 may include a second inclined surface 623b facing the first inclined surface 613b, wherein the sealing portion 640 may be positioned on the first inclined surface 613b or the second inclined surface 623b.

In an embodiment, the second housing 520 may include: a first portion 520b in which the sound unit 555a is positioned, and a second portion 520a in which the sound unit 555a is not positioned, wherein a thickness of the first portion 520b may be greater than a thickness of the second portion 520a.

According to various embodiments, an electronic device may include: a display 761 including a first area 761a, a second area 761b, and a flexible area 761c between the first area 761a and the second area 761b, a first housing 710, 810 positioned in the first area 761a and including a waveguide 870, a second housing 720, 820 positioned in the second area 761b, a hinge structure connecting the first housing 710, 810 and the second housing 720, 820, positioned in at least a portion of the flexible area 761c, and configured to rotate the second housing 720, 820 relative to the first housing 710, 810 between a folded state in which the first area 761a and the second area 761b face each other and an unfolded state in which the first area 761a and the second area 761b do not face each other, and a sound unit 855 configured to output or receive a sound, the sound unit 855 positioned in the second housing 820 such that the sound is radiated in a first direction through the second housing 820 in the unfolded state and radiated in a second direction different from the first direction along the waveguide 870 in the folded state.

In an embodiment, the waveguide 870 may include a first guide surface 871 extending in a direction parallel to a normal direction of the first area 761a.

In an embodiment, the waveguide 870 may further include a second guide surface 872 connected to the first guide surface 871 and extending in a direction intersecting an extending direction of the first guide surface 871.

In an embodiment, the second guide surface 872 may be inclined with respect to the first guide surface 871.

In an embodiment, the second housing 820 may include a side surface, wherein the output sound may be radiated through the side surface.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a first housing comprising a first surface and a first side surface connected to the first surface;
a second housing comprising a second surface and a second side surface connected to the second surface, the second housing being configured to move relative to the first housing between a closed state in which the second surface faces the first surface and the second side surface faces the first side surface, and an open state in which the second surface moves along the first surface and the second side surface moves along the first side surface;
a display disposed on an opposite side of the first surface and an opposite side of the second surface, the display having a first area in the closed state and having a second area greater than the first area in the open state; and
a sound unit configured to output or receive a sound, the sound unit being disposed in the second housing such that the sound is radiated in a first direction through the second side surface in the open state and radiated in a second direction different from the first direction along the first side surface in the closed state,
wherein the first housing further comprises a third surface disposed opposite the first surface and connected to the first side surface, and wherein the third surface guides the sound radiated along the first side surface in the closed state.

2. The electronic device of claim 1, wherein the second side surface comprises:
   a first wall connected to the second surface; and
   a second wall forming a gap through which the output sound passes, the second wall being separated from the first wall.

3. The electronic device of claim 2, wherein the gap comprises a slit extending along the second side surface.

4. The electronic device of claim 1,
   wherein the first housing further comprises a recess on the first side surface, and
   wherein the recess guides the sound between the first side surface and the second side surface in the closed state.

5. The electronic device of claim 1, wherein the third surface at least partially overlaps an edge area of the display.

6. The electronic device of claim 1,
   wherein the second housing further comprises a fourth surface disposed opposite the second surface and connected to the second side surface, and
   wherein the fourth surface and the third surface are configured with a gap therebetween and guide the sound together.

7. The electronic device of claim 6, wherein the fourth surface at least partially overlaps an edge area of the display.

8. The electronic device of claim 6, wherein the third surface and the fourth surface are substantially parallel.

9. The electronic device of claim 6, wherein the fourth surface comprises a second top surface or a second bezel surface.

10. The electronic device of claim 6, wherein the fourth surface extends in a direction along at least a portion of a second inner side surface connected to the second surface.

11. The electronic device of claim 1,
    wherein the first housing further comprises an opening in the third surface, and
    wherein the opening is configured to radiate the sound radiated along the first side surface to an outside or radiate an external sound of the electronic device along the first side surface to an inside of the electronic device, in the closed state.

* * * * *